United States Patent
Noro

(10) Patent No.: US 11,722,368 B2
(45) Date of Patent: Aug. 8, 2023

(54) SETTING CHANGE METHOD AND RECORDING MEDIUM RECORDING SETTING CHANGE PROGRAM

(71) Applicant: FUJITSU LIMITED, Kawasaki (JP)

(72) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 17/103,745

(22) Filed: Nov. 24, 2020

(65) Prior Publication Data
US 2021/0218627 A1    Jul. 15, 2021

(30) Foreign Application Priority Data
Jan. 14, 2020 (JP) .................. 2020-003666

(51) Int. Cl.
| | |
|---|---|
| H04L 41/0813 | (2022.01) |
| G06F 9/455 | (2018.01) |
| G06F 9/54 | (2006.01) |
| H04L 12/18 | (2006.01) |
| H04L 45/745 | (2022.01) |

(52) U.S. Cl.
CPC ...... *H04L 41/0813* (2013.01); *G06F 9/45558* (2013.01); *G06F 9/547* (2013.01); *H04L 12/1868* (2013.01); *H04L 45/745* (2013.01); *G06F 2009/45595* (2013.01)

(58) Field of Classification Search
CPC .......................... H04L 41/0813; G06F 9/45558
See application file for complete search history.

(56) References Cited

U.S. PATENT DOCUMENTS

| | | | |
|---|---|---|---|
| 9,870,248 B2* | 1/2018 | Tsirkin | ............... G06F 12/1009 |
| 2009/0327781 A1 | 12/2009 | Tripathi | |
| 2010/0306358 A1 | 12/2010 | Droux et al. | |
| 2013/0227097 A1 | 8/2013 | Yasuda et al. | |
| 2016/0283261 A1* | 9/2016 | Nakatsu | ............. G06F 9/45558 |
| 2019/0014039 A1 | 1/2019 | Shen et al. | |

FOREIGN PATENT DOCUMENTS

| | | | | |
|---|---|---|---|---|
| JP | 2007158870 A | * | 6/2007 | |
| JP | 2007158870 A | * | 6/2007 | ......... H04L 12/4645 |
| JP | 2012-065015 A | | 3/2012 | |
| JP | 2017-167822 A | | 9/2017 | |
| WO | WO-2012090573 A1 | * | 7/2012 | ......... G06F 9/45533 |

OTHER PUBLICATIONS

Extended European Search Report dated Apr. 23, 2021 for corresponding European Patent Application No. 20208046.1, 7 pages.

* cited by examiner

*Primary Examiner* — Douglas B Blair
(74) *Attorney, Agent, or Firm* — Fujitsu Patent Center

(57) ABSTRACT

A setting change method that causes a computer to execute processing includes: receiving a setting change request packet for a kernel from software operating over a container executed in one of OSs; acquiring identification information of one of communication modules that has received the setting change request packet, from the received setting change request packet; and referring to a storage unit that stores information indicating correspondence relationships between identification information of the OSs and the identification information of the communication modules in the OSs and determining the OS in which the container is operating based on the acquired identification information of the communication module.

14 Claims, 28 Drawing Sheets

SETTING CHANGE METHOD AND RECORDING MEDIUM RECORDING SETTING CHANGE PROGRAM

CROSS-REFERENCE TO RELATED APPLICATION

This application is based upon and claims the benefit of priority of the prior Japanese Patent Application No. 2020-3666, filed on Jan. 14, 2020, the entire contents of which are incorporated herein by reference.

FIELD

The embodiments discussed herein are related to a setting change method and a setting change program.

BACKGROUND

There has been heretofore a virtualization technology in which execution environments called containers isolated from the other environments are prepared by internally dividing a kernel of an operating system (OS) and applications are operated over the containers. For example, each container operates as one of the processes of the host OS and all containers share the resources of the host OS.

Related art is disclosed in Japanese Laid-open Patent Publication No. 2012-65015 and Japanese Laid-open Patent Publication No. 2017-167822.

SUMMARY

According to an aspect of the embodiments, a setting change method that causes a computer to execute processing includes: receiving a setting change request packet for a kernel from software operating over a container executed in one of OSs; acquiring identification information of one of communication modules that has received the setting change request packet, from the received setting change request packet; and referring to a storage unit that stores information indicating correspondence relationships between identification information of the OSs and the identification information of the communication modules in the OSs and determining the OS in which the container is operating based on the acquired identification information of the communication module.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, there is a technique of determining a setting change item and a setting target network (NW) device in a multi-tenant information processing system when a configuration of a virtual server of a tenant is changed. There is also a network service evaluation system that measures a service interruption time in live migration.

However, the techniques have such a problem that, when an application operating over a container requests to change a kernel setting for the container, time and labor taken to determine an OS in which the target container is executed are great.

Which one of OSs operating in different hosts and virtual environments is an OS over which a container being a target in a setting change is operating may be easily determined.

Hereinafter, embodiments of a setting change method and a setting change program according to the present invention are described in detail with reference to the drawings.

Embodiment 1

First, a system configuration example of an information processing system 100 according to Embodiment 1 is described. The information processing system 100 is applied to, for example, a computer system that provides a cloud service of lending application execution environments to users.

Figure 1:
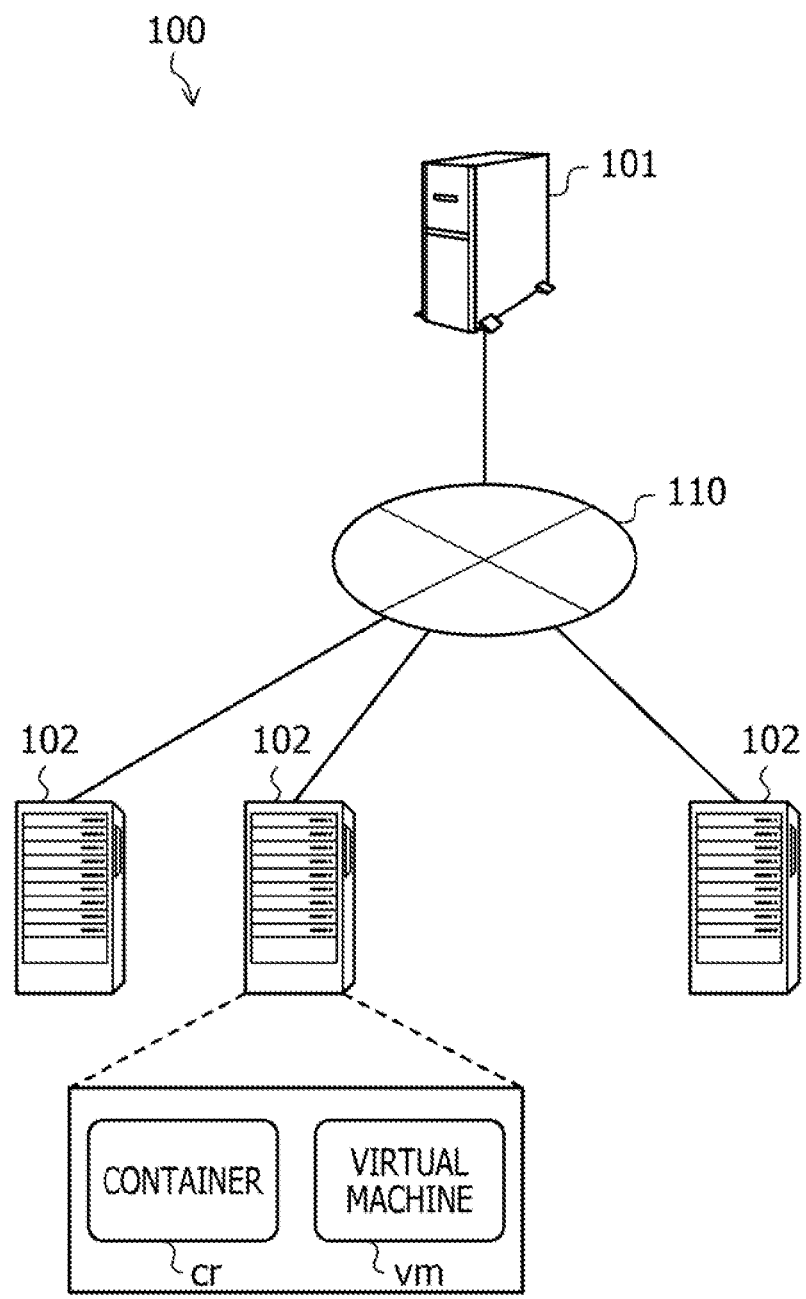
FIG. 1 is an explanatory diagram illustrating a system configuration example of an information processing system 100 according to Embodiment 1.

FIG. 1 is an explanatory diagram illustrating a system configuration example of the information processing system 100 according to Embodiment 1. In FIG. 1, the information processing system 100 includes a setting management server 101 and multiple operation servers 102. In the information processing system 100, the setting management server 101 and the multiple operation servers 102 are coupled to one another via a wired or wireless network 110. The network 110 is, for example, the Internet, a local area network (LAN), a wide area network (WAN), or the like.

The setting management server 101 is a computer (information processing apparatus) that receives a setting change request packet from software operating over a container cr executed by any one of the OSs. The setting change request packet is a packet for requesting a setting change of a kernel. The kernel is software that has a central role in the OS and executes basic functions of the OS. For example, the setting change request packet is a packet for requesting setting changes of various parameters of the kernel for the container cr.

The container cr corresponds to a user space that is created by internally dividing the kernel of the OS and that is isolated from the other spaces, and operates as one of the processes of the OS. The user space is an execution environment in which resources to be used by a user to execute an application are grouped into one set.

The resources of the OS are logically divided and shared by multiple containers cr. For example, an Internet Protocol (IP) address or a host name are assigned to each container cr. The resources such as a central processing unit (CPU), a memory, and a disk are also logically divided for each of the containers cr.

The container cr is implemented by, for example, a namespace function and a control groups (cgroups) function of the OS kernel. The namespace function is a function having a role of grouping processes and isolating the group of processes from the other groups. The cgroups function is a function of controlling allocation of resources to each group of processes.

Each operation server 102 is a computer (information processing apparatus) capable of executing the container cr. The operation server 102 may be capable of executing a virtual machine vm. The virtual machine vm is a virtual computer that operates in an execution environment constructed by dividing hardware resources of a physical computer. The virtual machine vm is achieved by virtualizing hardware resources with, for example, a hypervisor.

The setting management server 101 and the multiple operation servers 102 are achieved by, for example, cloud computing servers. The setting management server 101 may be achieved by, for example, one of the multiple operation servers 102. The information processing system 100 may include multiple setting management servers 101.

A guest OS runs in the virtual machine vm but the container cr includes no OS (no OS is installed). Since there is one OSs that is operating even if multiple containers cr are activated over one physical server, the resource consumption and the processing load are smaller than those of the virtual machine vm. The activation time of the container cr is also shorter than that of the virtual machine vm.

Meanwhile, since the range of user authority extends to the kernel in the case of the virtual machine vm, the user may freely change a kernel setting (for example, kernel version selection, parameter tuning, and the like) of the OS. However, in the case of the container cr, the user does not have the authority to manage the kernel.

Accordingly, the user sometimes requests a person (for example, a system administrator) having the authority to manage the kernel to perform setting change for the kernel for the container cr. For example, assume a case where the user requests the system administrator to change the kernel setting of the OS in which a certain container cr is operating. In this case, the system administrator searches for the OS in which the target container cr is being executed, and changes the kernel setting.

However, in the method of the related art, the system administrator or the like has to manually search for the OS in which the target container cr is being executed, and work of determining the execution location takes time and labor. For example, there occurs troublesome work in which the system administrator inquiries a container management server, a container operation server (for example, the operation server 102), and the like to search for the execution location of the container cr.

A mechanism for automatically adjusting the execution location of the container cr is being increasingly introduced in consideration of load of a server that executes the container cr. However, when the execution location of the container cr is dynamically changed depending on the load of each server, the execution location of the container cr is continuously monitored and this leads to an increase in operation cost.

Accordingly, in the present embodiment, description is given of a setting change method that enables easy determination of the OS in which the container cr being the target in the setting change is operating, and thereby reduces the work load and the work time taken to change the setting of the OS. First, an operation example of the information processing system 100 according to Embodiment 1 is described with reference to FIGS. 2 to 5.

Figure 2:
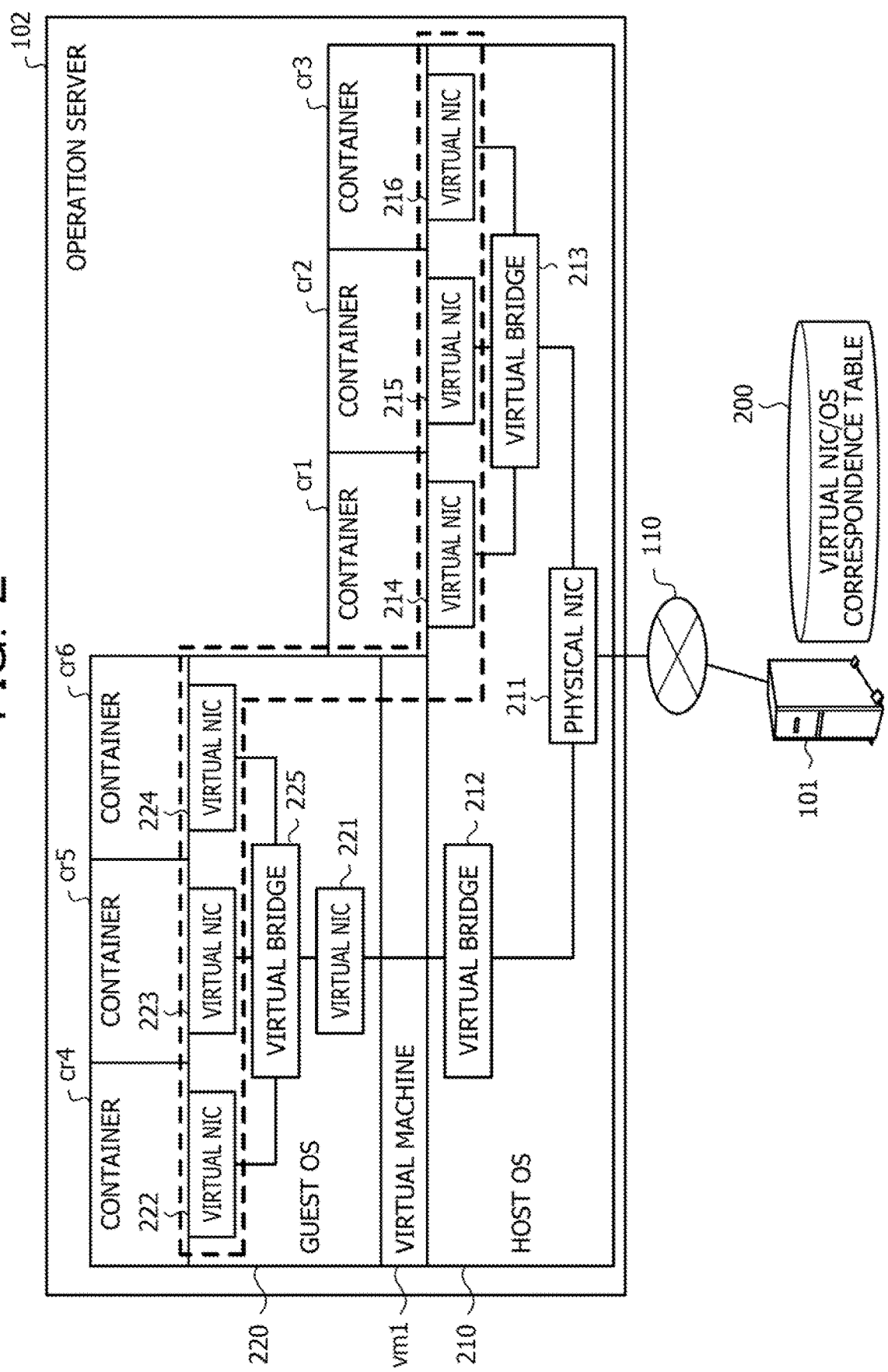
FIG. 2 is an explanatory diagram (part 1) illustrating an operation example of the information processing system 100 according to Embodiment 1.

FIGS. 2 to 5 are explanatory diagrams illustrating the operation example of the information processing system 100 according to Embodiment 1. FIG. 2 illustrates the setting management server 101 and the operation server 102 in the information processing system 100. A virtual machine vm1 and containers cr1 to cr3 are operating over a host OS 210 of the operation server 102. Containers cr4 to cr6 are also operating over a guest OS 220 of the virtual machine vm1.

The host OS 210 includes a physical network interface card (NIC) 211, virtual bridges 212, 213, and virtual NICs 214 to 216. The guest. OS 220 includes virtual NICs 221 to 224 and a virtual bridge 225. The physical NIC 211 is a device for coupling with the network 110.

The virtual bridges 212, 213, 225 are virtual bridges that relay data. The virtual NICs 214 to 216, 221 to 224 are virtual NICs. The virtual NICs 214 to 216 are container-host OS coupling virtual NICs. The virtual NICs 214 to 216 correspond respectively to the containers cr1 to cr3.

The virtual NIC 221 is a guest OS-host OS coupling virtual NIC. The virtual NICs 222 to 224 are container-guest OS coupling virtual NICs. The virtual NICs 222 to 224 correspond respectively to the containers cr4 to cr6.

The setting management server 101 creates a virtual NIC/OS correspondence table 200. The virtual NIC/OS correspondence table 200 stores information indicating correspondence relationships between identification information of OSs and identification information of virtual NICs in the OSs. In the example of FIG. 2, the target virtual NICs are the virtual NICs within the dotted line frame. The virtual NIC/OS correspondence table 200 may be created in advance and stored in the setting management server 101.

Figure 6:
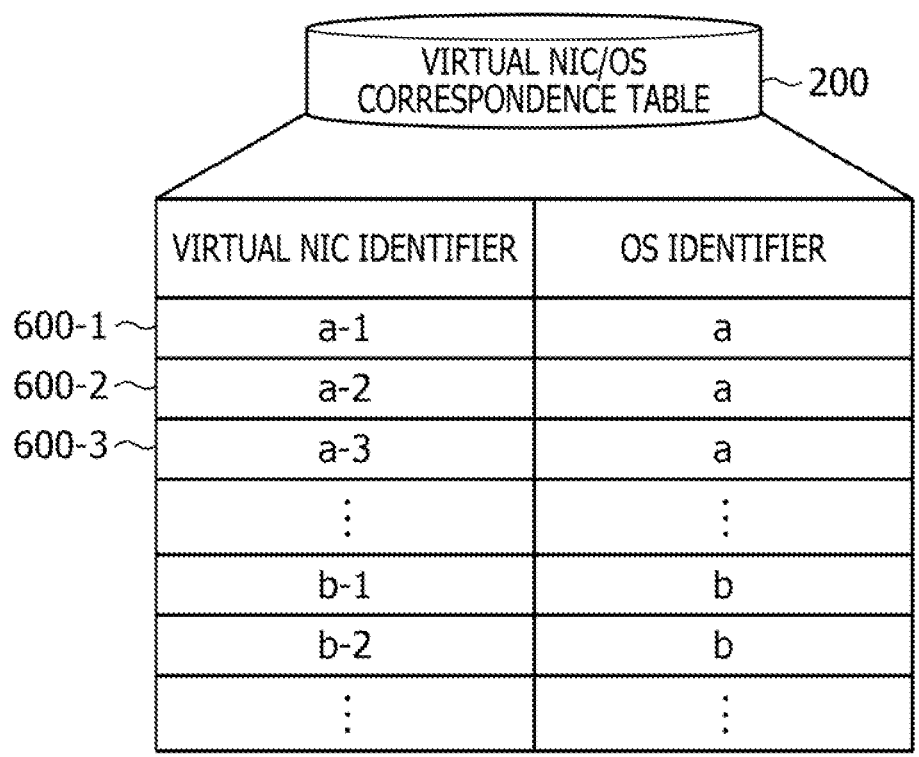
FIG. 6 is an explanatory diagram illustrating an example of storage contents of the virtual NIC/OS correspondence table 200.

FIG. 6 is an explanatory diagram illustrating an example of storage contents of the virtual NIC/OS correspondence table 200. In FIG. 6, the virtual NIC/OS correspondence table 200 has fields for virtual NIC identifiers and OS identifiers, and stores virtual NIC information (for example, virtual NIC information 600-1 to 600-3) as records by setting information in each field.

Each virtual NIC identifier is identification information for uniquely identifying a corresponding one of the virtual NICs. For example, each virtual NIC identifier is an ID of the corresponding virtual NIC. Each OS identifier is identification information for uniquely identifying a corresponding one of the OSs (host OS or guest OS). For example, each OS identifier is an ID of the corresponding OS. The OS identifier may be information for determining a control target module in the kernel of the OS.

For example, the virtual NIC information 600-1 indicates a virtual NIC identifier "a-1" assigned to the virtual NIC in the OS identified by an OS identifier "a".

Figure 3:
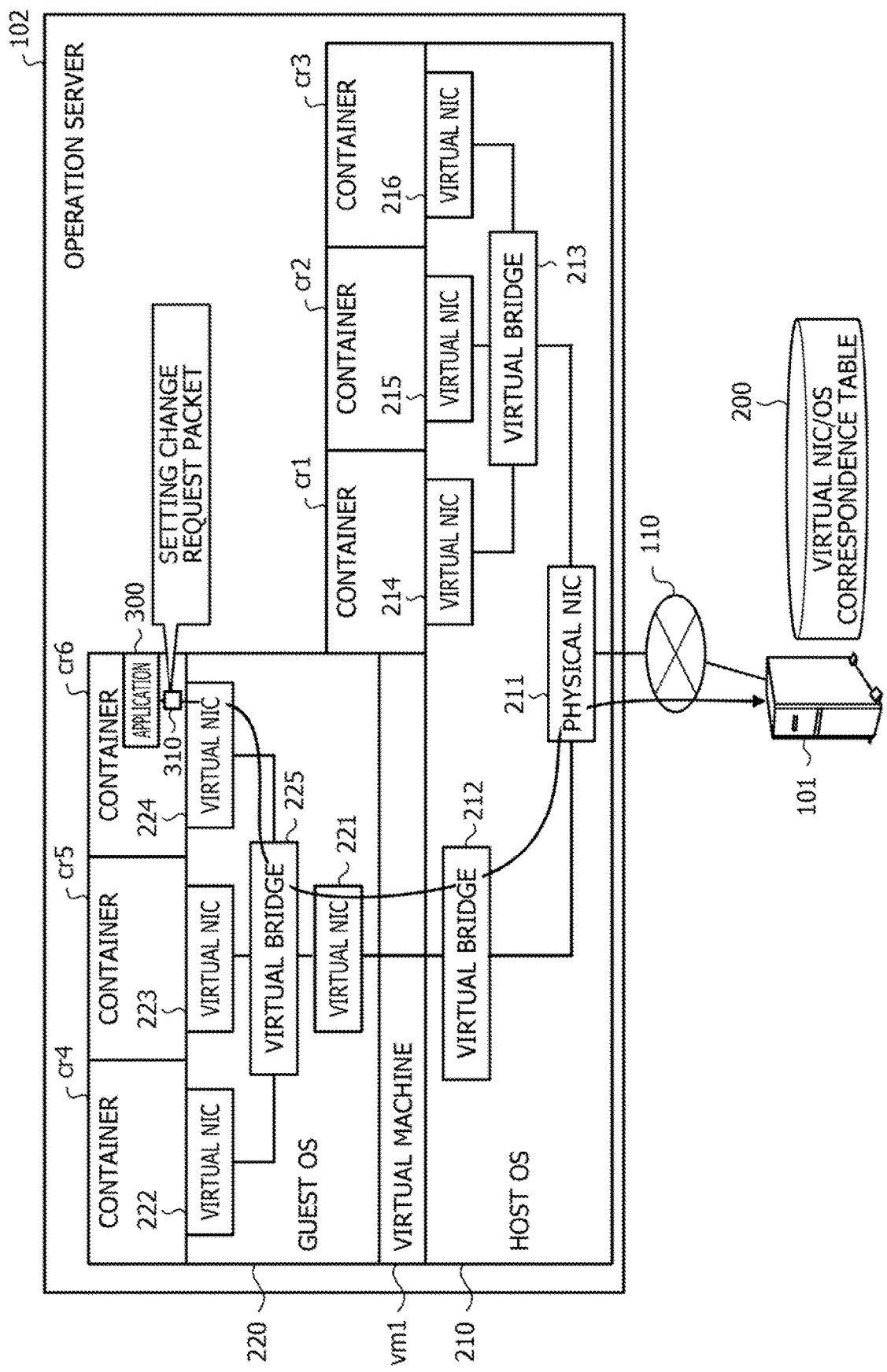
FIG. 3 is an explanatory diagram (part 2) illustrating the operation example of the information processing system 100 according to Embodiment 1.

In FIG. 3, an application 300 transmits a setting change request packet 310 to the setting management server 101. The application 300 is an application (software) of the user operating over the container cr6. The setting change request packet 310 is a packet for requesting a setting change for the kernel of the OS in which the container cr6 is executed.

The setting change request packet 310 is transmitted from the application 300 to the setting management server 101, for example, in response to a request from the user. Note that the user does not have the authority to manage the kernel and the setting change request packet 310 does not include information such as the OS identifier for determining the OS in which the container cr6 is executed.

Figure 4:
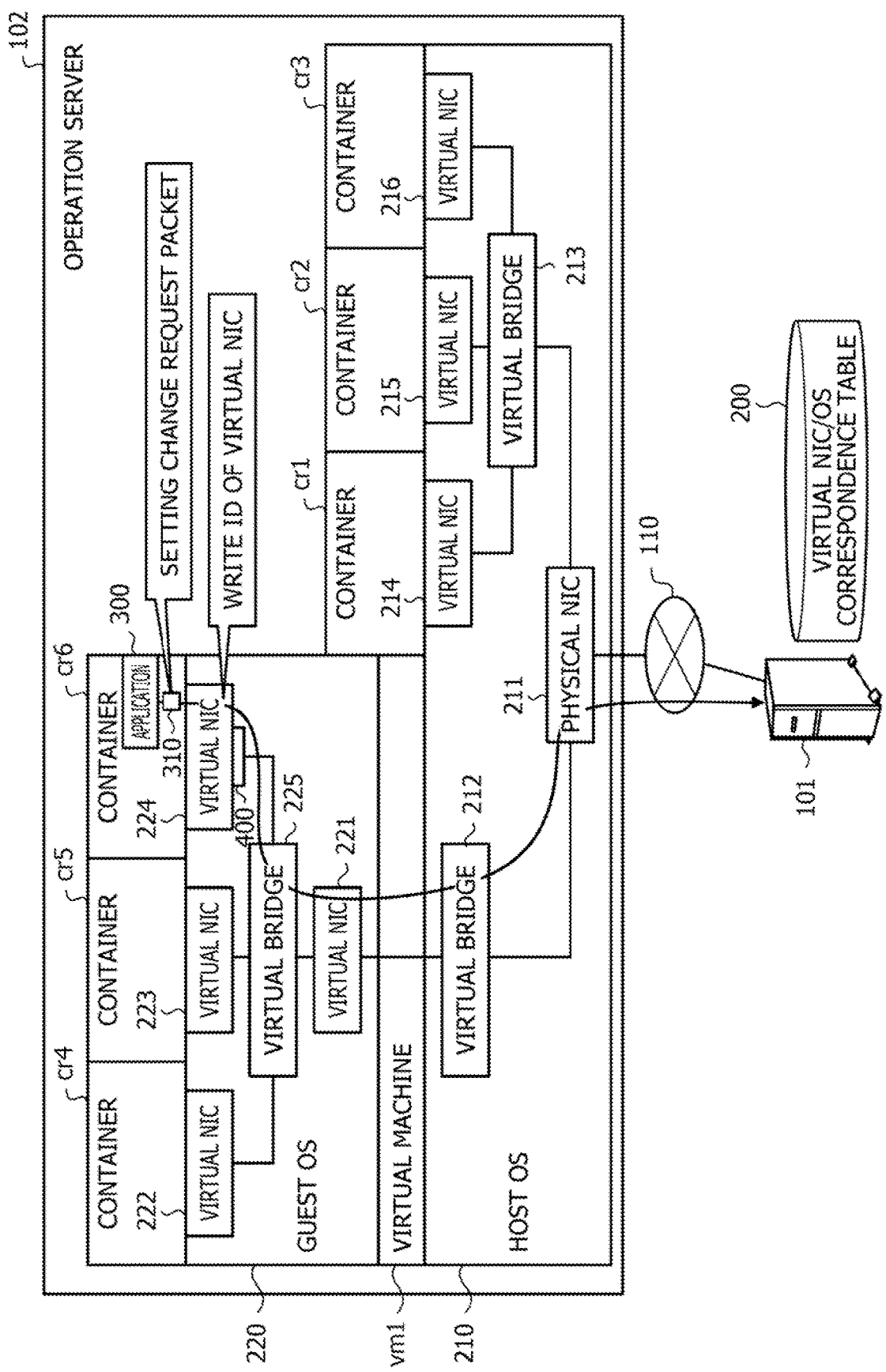
FIG. 4 is an explanatory diagram (part 3) illustrating the operation example of the information processing system 100 according to Embodiment 1.

In FIG. 4, a processing module 400 is a module provided corresponding to the container cr6. The processing module 400 is achieved by, for example, a program (so-called small VM). An arrangement example of the processing module 400 is described with reference to FIG. 7.

Figure 7:
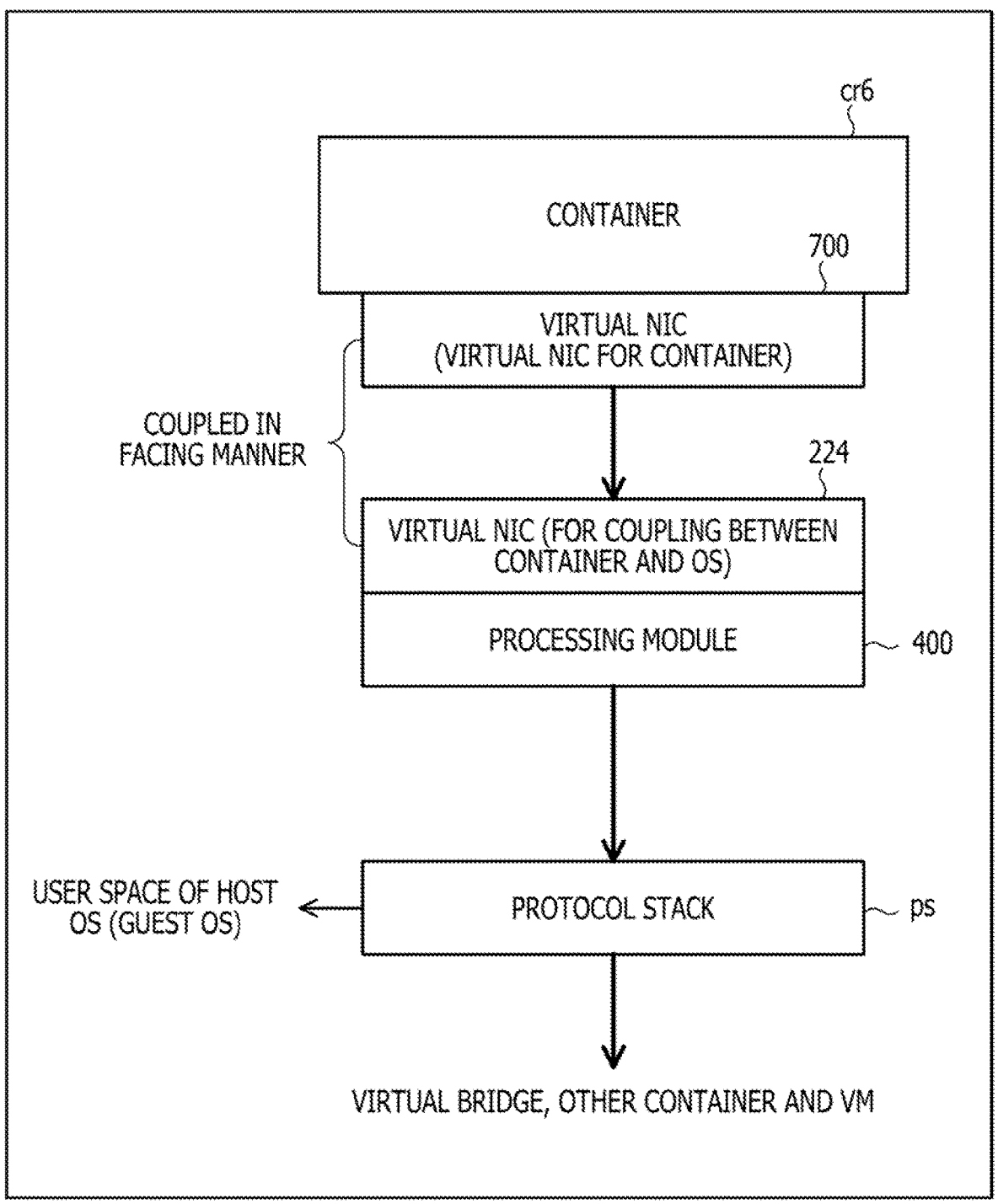
FIG. 7 is an explanatory diagram illustrating an arrangement example of a processing module.

FIG. 7 is an explanatory diagram illustrating an arrangement example of the processing module. In FIG. 7, the processing module 400 is arranged between the virtual NIC 224 and a protocol stack ps. The protocol stack ps is a module that implements a series of communication protocols for achieving communication over a computer (not illustrated in FIGS. 2 to 5). For example, the protocol stack ps is a protocol stack of Transmission Control Protocol (TCP)/IP. The virtual NIC 224 is a container-OS coupling virtual NIC visible from the setting management server 101, and is coupled to a virtual NIC 700 (not illustrated in FIGS. 2 to 5) for the container cr6 to face it in a one-to-one manner.

When the processing module 400 receives the setting change request packet 310 from the application 300, the processing module 400 writes identification information (for example, ID of the virtual NIC) of the virtual NIC 224 that has received the setting change request packet 310, to a header of the setting change request packet 310. The virtual NIC 224 is a virtual NIC coupled to the virtual NIC 700 for the container cr6 in a facing manner.

The processing module 400 transfers the setting change request packet 310 to which the identification information of the virtual NIC 224 is written, to the protocol stack ps. The setting change request packet 310 transferred to the protocol stack ps is transmitted to the setting management server 101 via the physical NIC 211 of the host OS 210.

The virtual NIC 224 is coupled to the virtual NIC 700 for the container cr6 to face it in a one-to-one manner. Therefore, it may be said that the identification information of the virtual NIC 224 corresponds to the virtual NIC 700 for the container cr6 and corresponds to the container cr6.

Figure 5:
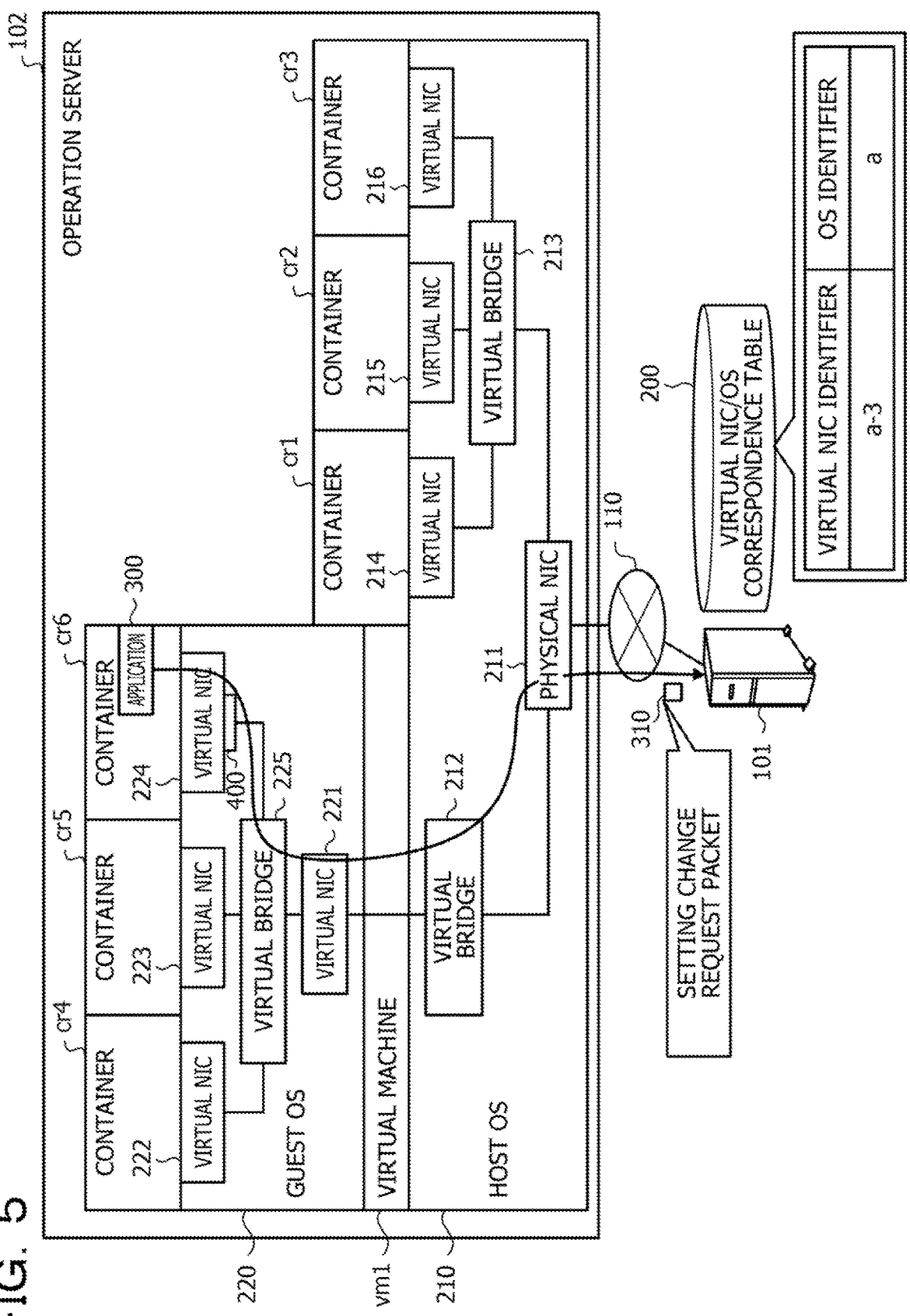
FIG. 5 is an explanatory diagram (part 4) illustrating the operation example of the information processing system 100 according to Embodiment 1.

In FIG. 5, when the setting management server 101 receives the setting change request packet 310, the setting management server 101 acquires the identification information of the virtual NIC that has received the setting change request packet 310, from the setting change request packet 310. For example, the setting management server 101 acquires the identification information of the container-OS coupling virtual NIC 224 that is coupled to the virtual NIC 700 for the container cr6 in a facing manner, from the header of the setting change request packet 310.

Next, for example, the setting management server 101 refers to the virtual NIC/OS correspondence table 200 illustrated in FIG. 6 and determines the OS in which the container cr6 is executed based on the acquired identification information of the virtual NIC 224. For example, assume that the identification information of the virtual NIC 224 is the virtual NIC identifier "a-3".

In this case, the setting management server 101 refers to the virtual NIC/OS correspondence table 200 and determines the OS identifier "a" corresponding to the virtual NIC identifier "a-3". The setting management server 101 then determines the OS in which the container cr6 is operating, for example, the OS in which the container cr6 is executed, from the OS identifier "a". In this case, the OS identified by the OS identifier "a" is determined as the OS in which the container cr6 is executed.

The information processing system 100 may thereby automatically determine which one of the OSs operating in different hosts and virtual environments is the OS (OS with the OS identifier "a") over which the target container cr6 is operating, according to the setting change request from the application 300 operating over the container cr6. Accordingly, it is possible to omit the troublesome work of determining the execution location of the container cr6 and thus reduce the work load and the work time for changing the setting of the OS.

Processing of changing the setting of the OS (OS with the OS identifier "a") in response to the setting change request packet 310 may be executed by the setting management server 101 or by another computer different from the setting management server 101. The processing of changing the setting of the OS (OS with the OS identifier "a") may be manually performed by a system administrator or the like.

(Hardware Configuration Example of Setting Management Server 101)

Figure 8:
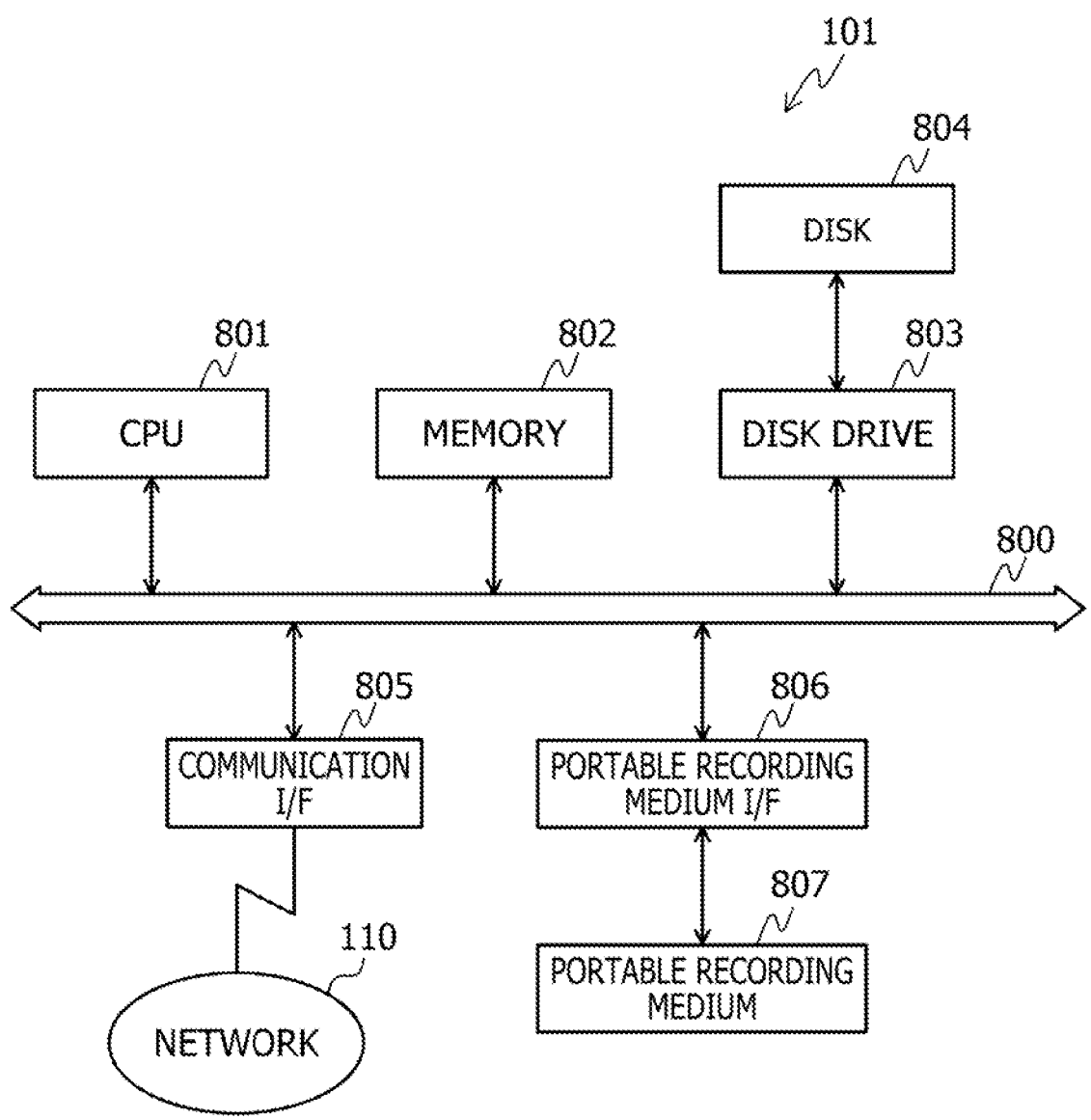
FIG. 8 is a block diagram illustrating a hardware configuration example of a setting management server 101.

FIG. 8 is a block diagram illustrating a hardware configuration example of the setting management server 101. In FIG. 8, the setting management server 101 includes a CPU 801, a memory 802, a disk drive 803, a disk 804, a communication interface (I/F) 805, a portable recording medium I/F 806, and a portable recording medium 807. These components are coupled to one another via a bus 800.

The CPU 801 controls the entire setting management server 101. The CPU 801 may have multiple cores. The memory 802 includes, for example, a read-only memory (ROM), a random-access memory (RAM), a flash ROM, and the like. For example, the flash ROM stores a program of the OS, the ROM stores an application program, and the RAM is used as a work area of the CPU 801. The programs stored in the memory 802 are loaded into the CPU 801 and cause the CPU 801 to execute coded processing.

The disk drive 803 controls reading and writing of data from and to the disk 804 according to the control of the CPU 801. The disk 804 stores data written into the disk 804 under the control of the disk drive 803. Examples of the disk 804 include a magnetic disk and an optical disc.

The communication I/F 805 is coupled to the network 110 via a communication line and is coupled to an external computer (for example, the operation server 102 illustrated in FIG. 1) via the network 110. The communication I/F 805 functions as an interface between the network 110 and the inside of the apparatus and controls input and output of data from and to the external computer.

The portable recording medium I/F 806 controls reading and writing of data from and to the portable recording medium 807 according to the control of the CPU 801. The portable recording medium 807 stores data written into the portable recording medium 807 under the control of the portable recording medium 806. Examples of the portable recording medium 807 include a compact disc (CD)-ROM, a digital versatile disc (DVD), and a Universal Serial Bus (USB) memory.

The setting management server 101 may have, in addition to the aforementioned components, for example, a solid-state drive (SSD), an input device, a display, and the like. The setting management server 101 may not include, for example, the disk drive 803, the disk 804, the portable recording medium I/F 806, and the portable recording medium 807, among the aforementioned components.

The operation server 102 illustrated in FIG. 1 may also be implemented by the same hardware configuration as that of the setting management server 101.

(Functional Configuration Example of Setting Management Server 101)

Figure 9:
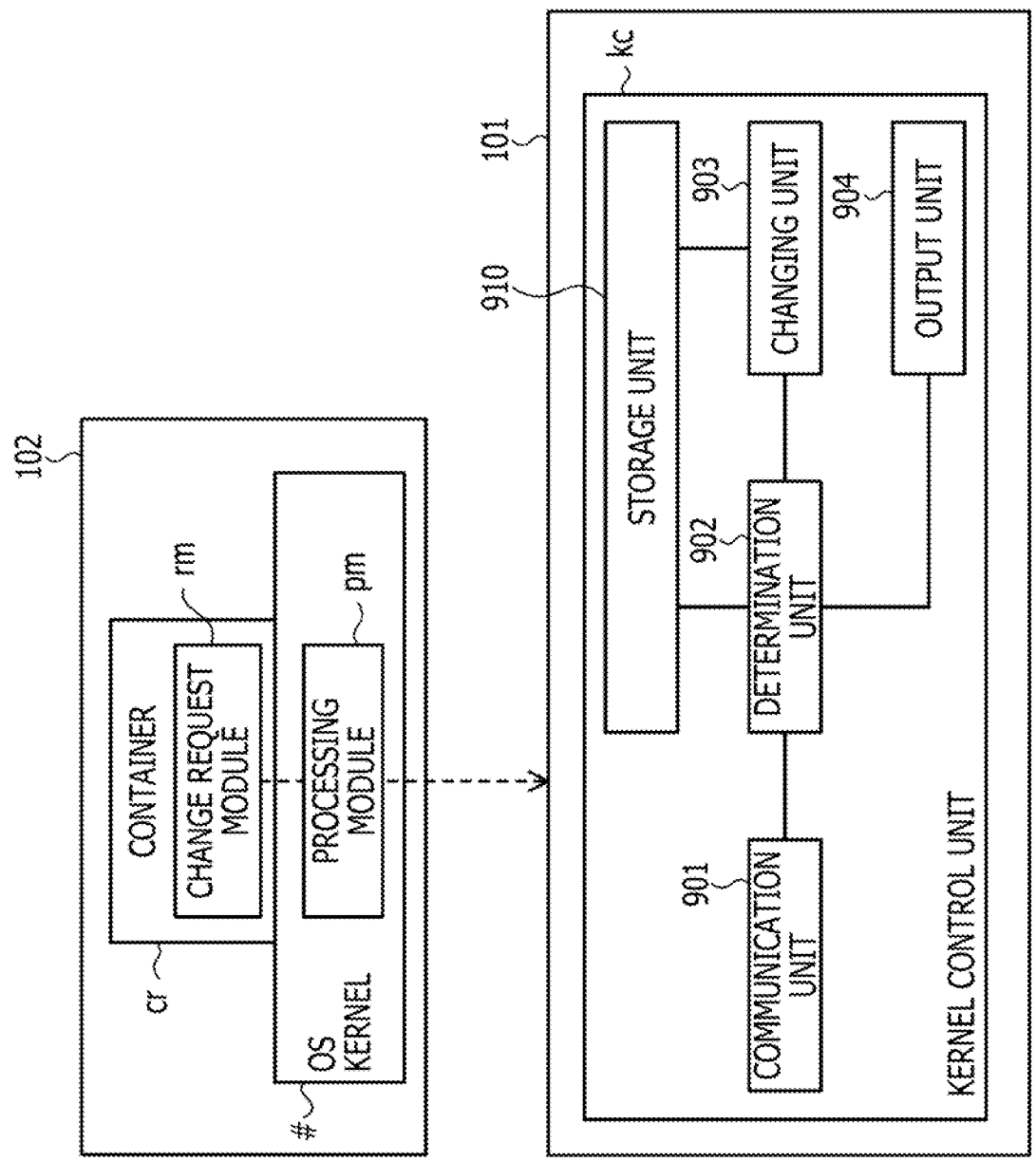
FIG. 9 is a block diagram illustrating a functional configuration example of the setting management server 101.

FIG. 9 is a block diagram illustrating a functional configuration example of the setting management server 101. In FIG. 9, the setting management server 101 includes a communication unit 901, a determination unit 902, a changing unit 903, an output unit 904, and a storage unit 910. The communication unit 901 to the output unit 904 are functions constituting a kernel control unit kc and, for example, each of these functions is implemented by the communication I/F 805 or by causing the CPU 801 to execute the programs stored in the storage devices such as the memory 802, the disk 804, and the portable recording medium 807 illustrated in FIG. 8. Processing results of the functional units are stored in, for example, the storage devices such as the memory 802 and the disk 804. The storage unit 910 is implemented by the storage devices such as the memory 802 and the disk 804. For example, the storage unit 910 stores the virtual NIC/OS correspondence table 200 illustrated in FIG. 6.

In the following description, any one of the OSs in the information processing system 100 is sometimes referred to as "OS #".

The communication unit 901 receives the setting change request packet from software operating over the container cr executed by one OS #. The setting change request packet is information for requesting the kernel setting change for the container cr. Examples of the kernel setting to be changed include a setting of the capacity of a communication buffer, a setting of a firewall, and a setting of the number of acceptable couplings for processing web access.

The change request content of the kernel setting is included in, for example, a payload (data body) of the setting change request packet. The header of the setting change request packet includes the identification information of the communication module that has received the setting change request packet. The communication module is a module for coupling to a computer network and is, for example, the virtual NIC.

For example, the communication unit 901 receives the setting change request packet, transmitted from a change request module rm in the container cr executed by the operation server 102, from the operation server 102. The change request module rm is implemented by, for example, an application (for example, the application 300 illustrated in FIG. 3) operating over the container cr.

The determination unit 902 acquires the identification information of the communication module that has received the setting change request packet, from the received setting change request packet. The determination unit 902 then refers to the storage unit 910 and determines the OS # in which the container cr is operating, based on the acquired identification information of the communication module. The storage unit 910 stores information indicating correspondence relationships between identification information of the OSs and identification information of communication modules in the OSs.

The communication modules in the OSs are modules for coupling to the other OSs, virtual machines, containers, and the like and are, for example, the virtual NICs in the OSs. The communication module that has received the setting change request packet is, for example, the virtual NIC that has received the setting change request packet.

In further detail, for example, the virtual NIC that has received the setting change request packet is a container-OS coupling virtual NIC that is coupled to a virtual NIC for the container cr in a facing manner. The virtual NIC for the container cr is, for example, the virtual NIC 700 illustrated in FIG. 7. The container-OS coupling virtual NIC that is coupled to the virtual NIC for the container cr in a facing manner is, for example, the virtual NIC 224 illustrated in FIG. 7.

For example, the determination unit 902 acquires the ID (virtual NIC identifier) of the virtual NIC that has received the setting change request packet, from the header of the received setting change request packet. The identification information of the communication module that has received the setting change request packet is written to the header of the setting change request packet by, for example, the processing module pm corresponding to the container cr in the OS #.

Next, the determination unit 902 refers to, for example, the virtual NIC/OS correspondence table 200 illustrated in FIG. 6 and determines the OS identifier corresponding to the acquired ID (virtual NIC identifier) of the virtual NIC. The determination unit 902 then determines the OS identified by the determined OS identifier, as the OS # in which the container cr is operating, for example, the OS # in which the request source container cr is executed.

The changing unit 903 changes the setting of the kernel of the determined OS # based on the change request content determined from the setting change request packet. For example, the changing unit 903 refers to the payload of the setting change request packet and determines the kernel setting change request content. The changing unit 903 then changes the setting of the kernel of the determined OS # according to the determined change request content.

In further detail, for example, the changing unit 903 changes the capacity of the communication buffer, the setting of the firewall, or the number of acceptable couplings for processing web access, for the target container cr. The target container cr is the request source container cr, for example, the container cr in which the software being the source of the setting change request packet is operating.

The target container cr may be determined from, for example, the source address of the setting change request packet. The control target module in the kernel for the target container cr may be determined from the virtual NIC/OS correspondence table 200. For example, the changing unit 903 may refer to a use authority of a user who is the request source and determine whether to allow change of the kernel setting of the OS #.

The output unit 904 outputs the determined identification information of the OS #. For example, the output unit 904 may output the determined identification information of the OS # in association with the identification information of the request source container cr. A method of output by the output unit 904 includes, for example, storing the information in a storage device such as the memory 802 or the disk 804, transmitting the information to another computer via the communication I/F 805, and displaying the information on a not-illustrated display.

In further detail, for example, the output unit 904 may transmit setting change information including the identification information of the request source container cr, the identification information of the OS #, and the kernel setting change request content, to an information processing terminal of the system administrator. The system administrator may thereby refer to the setting change information and easily determine the OS # in which the request source container cr is operating. The system administrator may also determine the kernel setting change request content and change the kernel setting for the request source container cr. In this case, for example, the system administrator may refer to the use authority of the user who is the request source and determine whether to allow the change of the kernel setting of the OS #.

The functional units of the setting management server 101 may be achieved by another computer (for example, the operation server 102) in the information processing system 100. The functional units of the setting management server 101 may be achieved by multiple computers (for example, the setting management server 101 and the operation server 102) in the information processing system 100.

(Example of Writing to Setting Change Request Packet)

Next, an example of writing of the identification information of the communication module to the setting change request packet is described with reference to FIGS. 10 and 11. The case where the ID (virtual NIC identifier) of the virtual NIC that has received the setting change request packet is written as the identification information of the communication module is described as an example.

Figure 10:
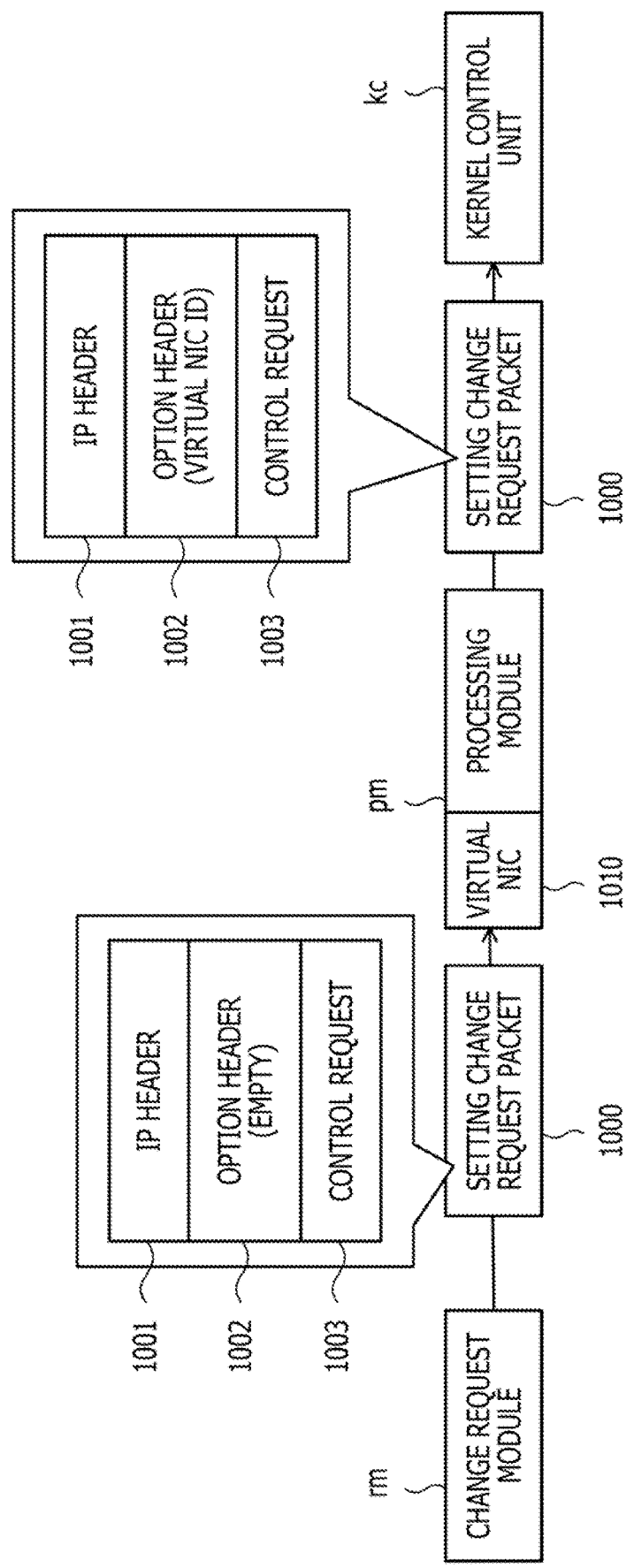
FIG. 10 is an explanatory diagram illustrating a first example of writing to a setting change request packet.

FIG. 10 is an explanatory diagram illustrating a first example of writing to the setting change request packet. In FIG. 10, a setting change request packet 1000 is an example of the setting change request packet transmitted from the change request module rm over the container cr. The setting change request packet 1000 includes an IP header 1001, an option header 1002, and a control request 1003.

The IP header 1001 stores information such as a source address and a destination address. The option header 1002 is an option header added by the change request module rm over the container cr. In further detail, for example, when the change request module rm transmits the setting change request packet 1000, the change request module rm opens a socket for transmitting the change request packet and sets a parameter for adding the option header into the socket.

For example, a record route option header or a time stamp option header may be used as the option header 1002. The record route option header is an option header for recording an IP address of an apparatus through which the packet has passed. The time stamp option header is an option header for recording an IP address of an apparatus through which the packet has passed and a passing time. The option header 1002 is empty in an initial state. The kernel setting change request content is recorded in the control request 1003.

When the processing module pm receives the setting change request packet 1000, the processing module pm writes all ID (32 bit) of a virtual NIC 1010 that has received the setting change request packet 1000, to the option header 1002 of the setting change request packet 1000. The virtual NIC 1010 is a container-OS coupling virtual NIC that is coupled to the virtual NIC for the container cr in a facing manner.

For example, the processing module pm may check the IP header of the received packet and determine whether the received packet is the setting change request packet, from destination information (IP address, port number, and the like). For example, when the received packet is a packet addressed to the kernel control unit kc, the processing module pm determines that the received packet is the setting change request packet. Meanwhile, when the received packet is not a packet addressed to the kernel control unit kc, the processing module pm determines that the received packet is not the setting change request packet.

When the kernel control unit kc receives the setting change request packet 1000, the kernel control unit kc reads the ID (32 bit) of the virtual NIC 1010 that has received the setting change request packet 1000, from the option header 1002 of the setting change request packet 1000.

The ID (virtual NIC identifier) of the virtual NIC that has received the setting change request packet may be thus recorded by using the available option header in the IP packet.

Figure 11:
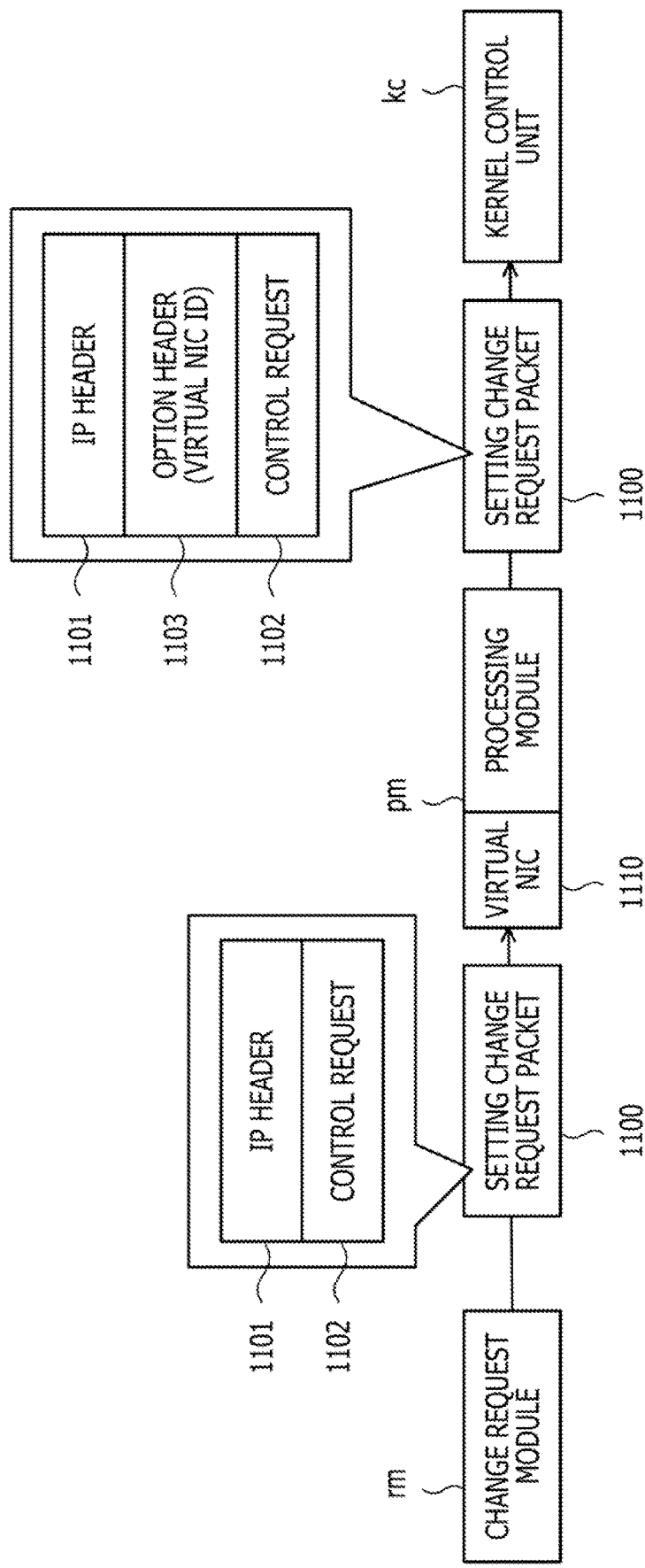
FIG. 11 is an explanatory diagram illustrating a second example of writing to the setting change request packet.

FIG. 11 is an explanatory diagram illustrating a second example of writing to the setting change request packet. In FIG. 11, a setting change request packet 1100 is an example of the setting change request packet transmitted from the change request module rm over the container cr. The setting change request packet 1100 is a packet of a format having no option header, and includes an IP header 1101 and a control request 1102.

When the processing module pm receives the setting change request packet 1100, the processing module pm adds an option header 1103 to the setting change request packet 1100. The processing module pm then writes an ID (32 bit) of a virtual NIC 1110 that has received the setting change request packet 1100, to the added option header 1103. The virtual NIC 1110 is a container-OS coupling virtual NIC that is coupled to the virtual NIC for the container cr in a facing manner.

When the kernel control unit kc receives the setting change request packet 1100, the kernel control unit kc reads the ID (32 bit) of the virtual NIC 1110 that has received the setting change request packet 1100, from the option header 1103 of the setting change request packet 1100.

The processing module pm may thus change the packet format of the setting change request packet, add the option header, and record the ID (virtual NIC identifier) of the virtual NIC that has received the setting change request packet.

(Use of Multicast Address)

Next, the case where a multicast address is used as the destination of the setting change request packet will be described with reference to FIG. 12.

Figure 12:
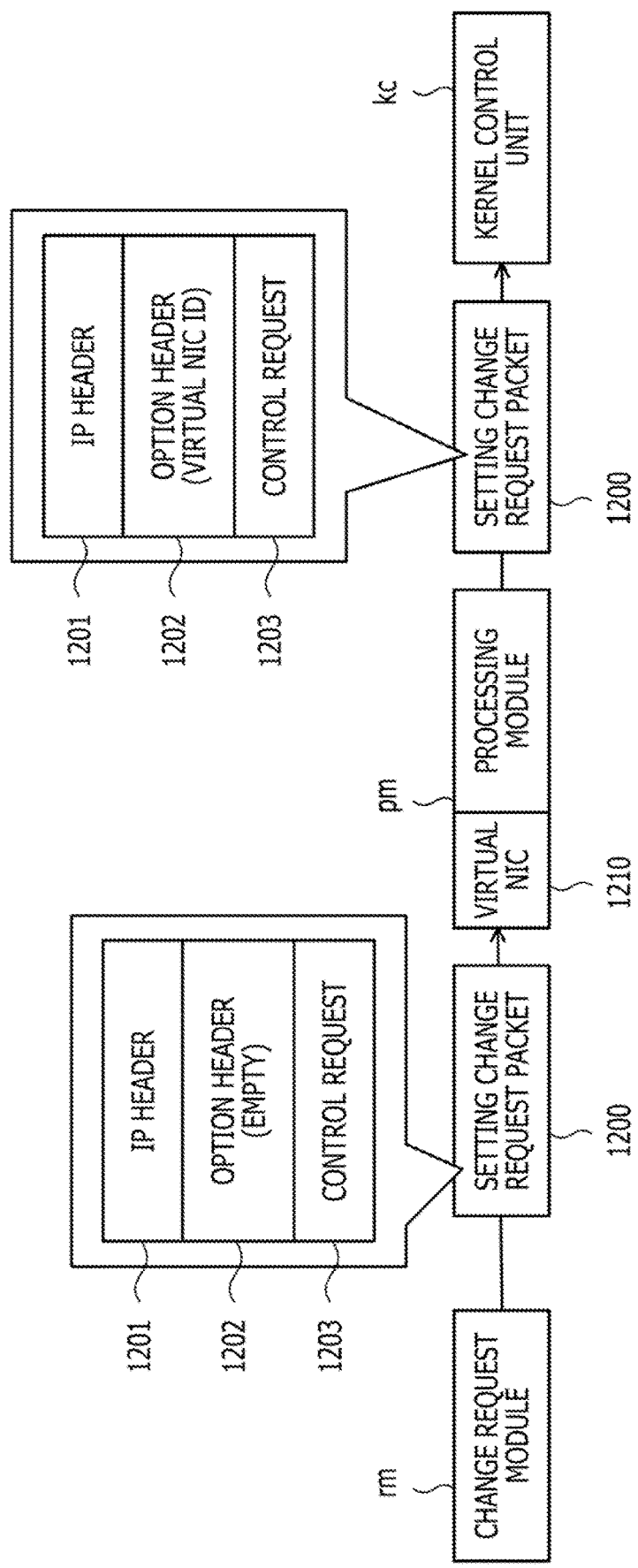
FIG. 12 is an explanatory diagram illustrating an example of transmitting the setting change request packet.

FIG. 12 is an explanatory diagram illustrating an example of transmitting the setting change request packet. In FIG. 12, a setting change request packet 1200 is an example of the setting change request packet transmitted from the change request module rm over the container cr. The setting change request packet 1200 includes an IP header 1201, an option header 1202, and a control request 1203.

The change request module rm sets a multicast address as the destination address in the IP header 1201 and transmits the setting change request packet 1200. The multicast address for the setting change request is, for example, set in advance in the change request module rm.

When the processing module pm receives the setting change request packet 1200, the processing module pm writes an ID of a virtual NIC 1210 that has received the setting change request packet 1200, to the option header 1202 of the setting change request packet 1200. The virtual NIC 1210 is a container-OS coupling virtual NIC that is coupled to the virtual NIC for the container cr in a facing manner.

For example, the processing module pm checks the IP header of the received packet and determines that the received packet is the setting change request packet when the multicast address is set as the destination address. Meanwhile, when the multicast address is not set as the destination address, the processing module pm determines that the received packet is not the setting change request packet.

When the kernel control unit kc receives the setting change request packet 1200, the kernel control unit kc determines whether the request source container cr (source) is a container cr to be handled by the kernel control unit kc. The setting change request packet from which source the kernel control unit kc is to process is, for example, set in advance in the kernel control unit kc.

When the container cr is a container to be handled by the kernel control unit kc, the kernel control unit kc reads the ID of the virtual NIC 1210 that has received the setting change request packet 1200, from the option header 1202 of the setting change request packet 1200. Meanwhile, when the container is not a container cr to be handled by the kernel control unit kc, the kernel control unit kc discards the setting change request packet 1200.

The change request module rm (container Cr) thus does not have to change a setting of the destination address of the setting change request packet even when the execution location of the container cr is changed. For example, assume a case of performing an operation in which the setting change request packet is transmitted to the nearest kernel control unit kc among multiple kernel control units kc in the information processing system 100. The nearest kernel control unit kc is, for example, a kernel control unit kc whose physical distance to the container cr is the shortest. In this case, using the multicast address as the destination of the setting change request packet allows the setting change request packet to be transmitted to the nearest kernel control unit kc without changing the setting of the destination even when the execution location of the container cr is changed.

(Rewriting of Destination Address)

Next, the case where the processing module pm rewrites the destination of the setting change request packet is described with reference to FIG. 13.

Figure 13:
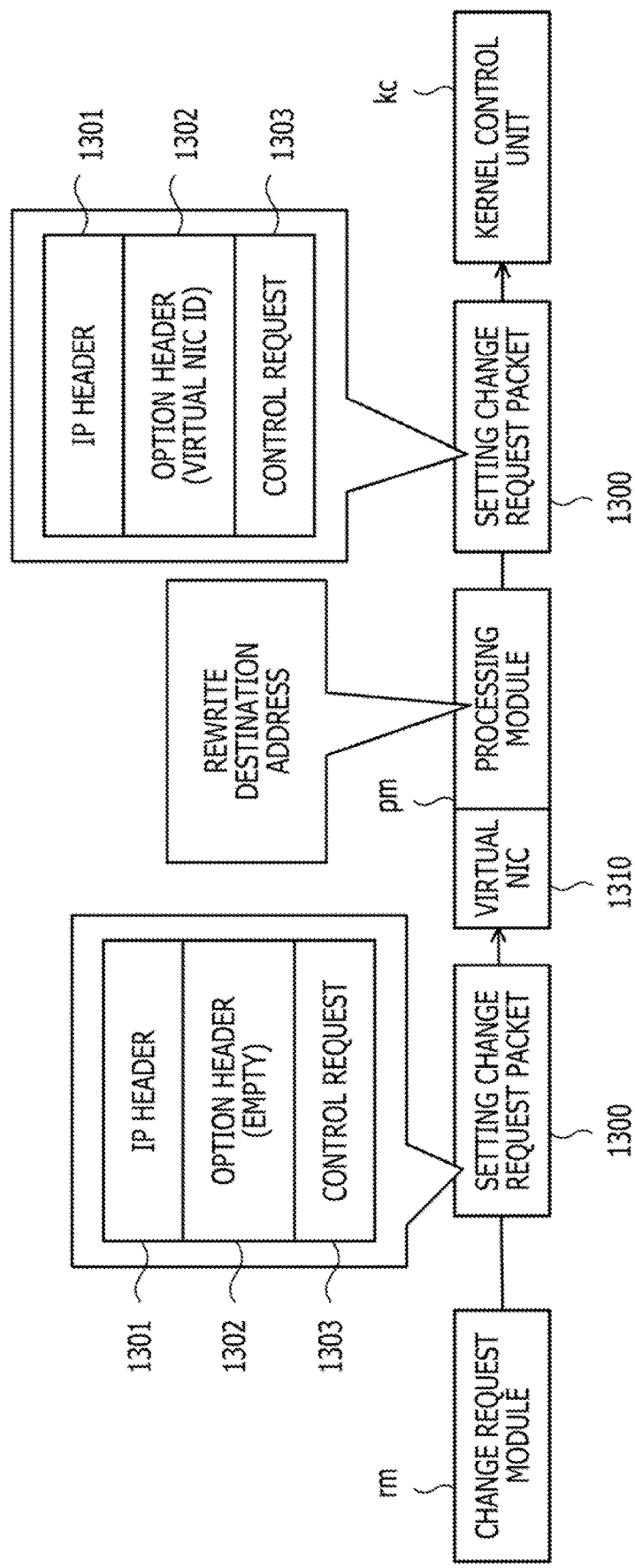
FIG. 13 is an explanatory diagram illustrating an example of rewriting a destination of the setting change request packet.

FIG. 13 is an explanatory diagram illustrating an example of rewriting the destination of the setting change request packet. In FIG. 13, a setting change request packet 1300 is an example of the setting change request packet transmitted from the change request module rm over the container cr. The setting change request packet 1300 includes an IP header 1301, an option header 1302, and a control request 1303.

The change request module rm sets a specific unicast address as the destination address in the IP header 1301 and transmits the setting change request packet 1300. The specific unicast address is, for example, a representative address for kernel control and is set in advance in the change request module rm.

When the processing module pm receives the setting change request packet 1300, the processing module pm sets an address of a kernel control unit kc corresponding to the processing module pm as the destination address in the IP header 1301, and transmits the setting change request packet 1300. The address of the kernel control unit kc is, for example, set in the processing module pm.

The processing module pm also writes an ID of a virtual NIC 1310 that has received the setting change request packet 1300, to the option header 1302 of the setting change request packet 1300. The virtual NIC 1310 is a container-OS coupling virtual NIC that is coupled to the virtual NIC for the container cr in a facing manner.

For example, the processing module pm checks the IP header of the received packet and determines that the received packet is the setting change request packet when the specific unicast address is set as the destination address. Meanwhile, when the specific unicast address is not set as the destination address, the processing module pm determines that the received packet is not the setting change request packet.

When the kernel control unit kc receives the setting change request packet 1300, the kernel control unit kc reads the ID of the virtual NIC 1310 that has received the setting change request packet 1300, from the option header 1302 of the setting change request packet 1300.

The change request module rm (container cr) thus does not have to change the setting of the destination address of the setting change request packet even when the execution location of the container cr is changed. Communication traffic in the setting change request may also be reduced from that in the case of using the multicast address.

(Various Processing Procedures of Information Processing System 100)

Next, various processing procedures of the information processing system 100 according to Embodiment 1 are described. First, a first transfer processing procedure of the processing module pm is described with reference to FIG. 14 by giving, as an example, the case where the address of the kernel control unit kc is set as the destination of the setting change request packet transmitted from the container cr.

Figure 14:
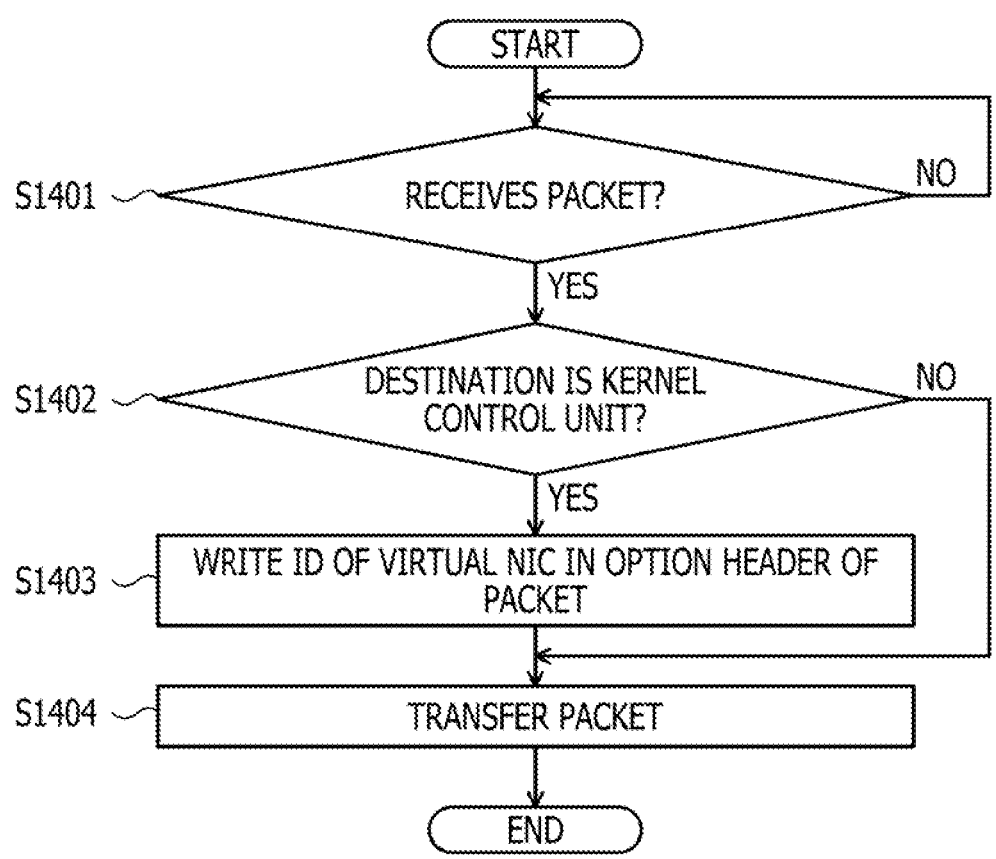
FIG. 14 is a flowchart illustrating an example of a first transfer processing procedure of the processing module pm according to Embodiment 1.

FIG. 14 is a flowchart illustrating an example of the first transfer processing procedure of the processing module pm according to Embodiment 1. In the flowchart of FIG. 14, first, the processing module pm determines whether it receives a packet transmitted from the container cr (step S1401). The processing module pm waits for reception of a packet transmitted from the container cr (step S1401: No).

When the processing module pm receives a packet transmitted from the container cr (step S1401: Yes), the processing module pm determines whether the destination of the received packet is the kernel control unit kc (step S1402). The address of the kernel control unit kc is stored in advance in the processing module pm.

When the destination of the packet is not the kernel control unit kc (step S1402: No), the processing module pm proceeds to step S1404. Meanwhile, when the destination of the packet is the kernel control unit kc (step S1402: Yes), the processing module pm writes an ID (virtual NIC identifier) of a virtual NIC that has received the packet, to the option header of the packet (step S1403).

The virtual NIC that has received the packet transmitted from the container cr is a container-OS coupling virtual NIC that is coupled to a virtual NIC for the container cr in a facing manner. For example, the processing module pm is provided corresponding to this container-OS coupling virtual NIC and is directly coupled to this container-OS coupling virtual NIC. The ID of the container-OS coupling virtual NIC is, for example, stored in advance in the processing module pm.

The processing module pm then transfers the packet (step S1404) and terminates the series of processes according to the flowchart. When the processing module pm receives the setting change request packet, the processing module pm may thus record the ID of the virtual NIC that has received the setting change request packet, in the option header of the setting change request packet.

Next, a second transfer processing procedure of the processing module pm is described with reference to FIG. 15 by giving, as an example, the case where the representative address (specific unicast address) for kernel control is set as the destination of the setting change request packet transmitted from the container cr.

Figure 15:
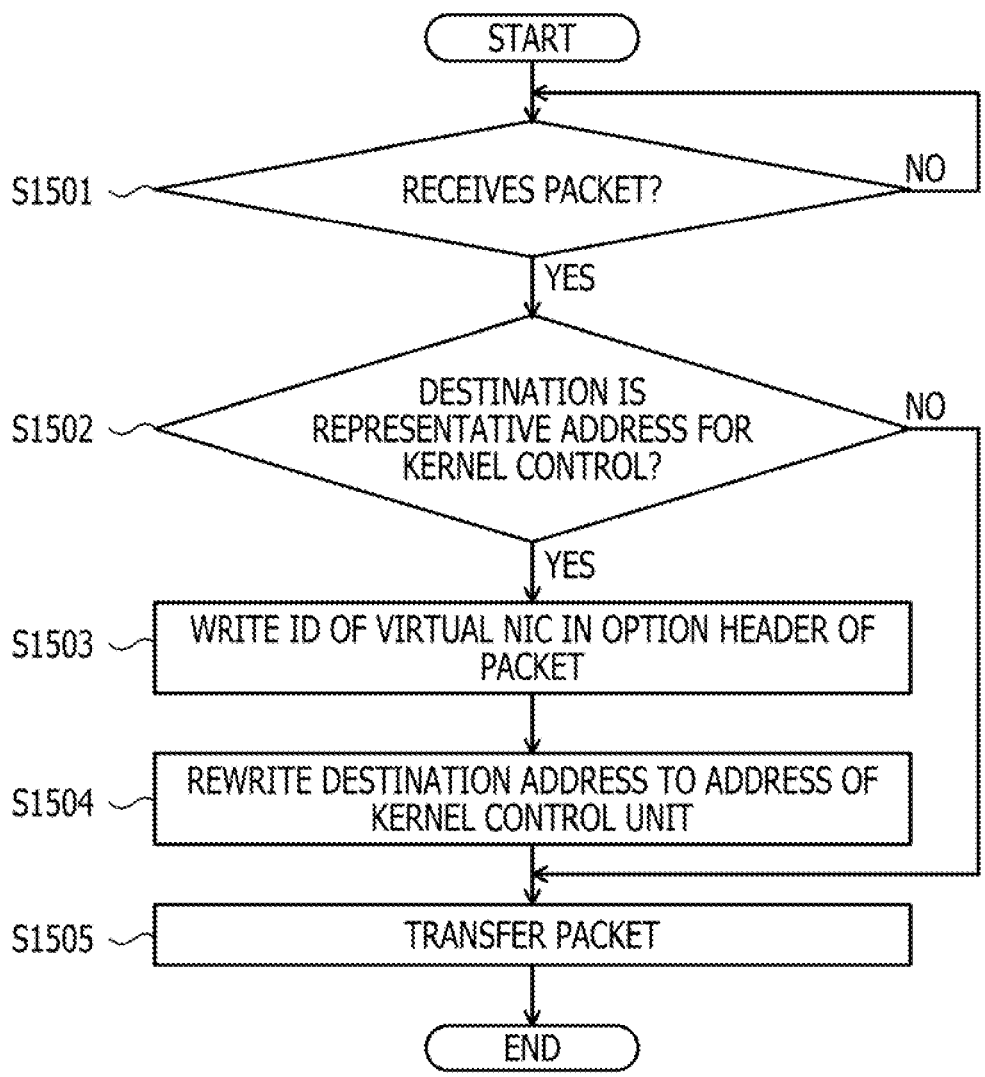
FIG. 15 is a flowchart illustrating an example of a second transfer processing procedure of the processing module pm according to Embodiment 1.

FIG. 15 is a flowchart illustrating an example of the second transfer processing procedure of the processing module pm according to Embodiment 1. In the flowchart of FIG. 15, first, the processing module pm determines whether it receives a packet transmitted from the container cr (step S1501). The processing module pm waits for reception of a packet transmitted from the container cr (step S1501: No).

When the processing module pm receives a packet transmitted from the container cr (step S1501: Yes), the processing module pm determines whether the destination of the received packet is the representative address for kernel control (step S1502). The representative address for kernel control is stared in advance in the processing module pm.

When the destination of the packet is not the representative address for kernel control (step S1502: No), the processing module pm proceeds to step S1505. Meanwhile, when the destination of the packet is the representative address for kernel control (step S1502: Yes), the processing module pm writes an ID (virtual NIC identifier) of a virtual NIC that has received the packet, to the option header of the packet (step S1503).

Next, the processing module pm rewrites the destination address in the IP header of the packet to the address of the kernel control unit kc (step S1504). The address of the kernel control unit kc is stored in advance in the processing module pm. The processing module pm then transfers the packet (step S1505) and terminates the series of processes according to the flowchart.

When the processing module pm receives the setting change request packet, the processing module pm may thus record the ID of the virtual NIC that has received the setting change request packet, in the option header of the setting change request packet. The processing module pm may also rewrite the destination address of the setting change request packet to the address of the actual kernel control unit kc. The change request module rm thus does not have to change the setting of the destination address of the setting change request packet even when the execution location of the container cr is changed.

Next, a setting change processing procedure of the kernel control unit kc according to Embodiment 1 is described with reference to FIG. 16.

Figure 16:
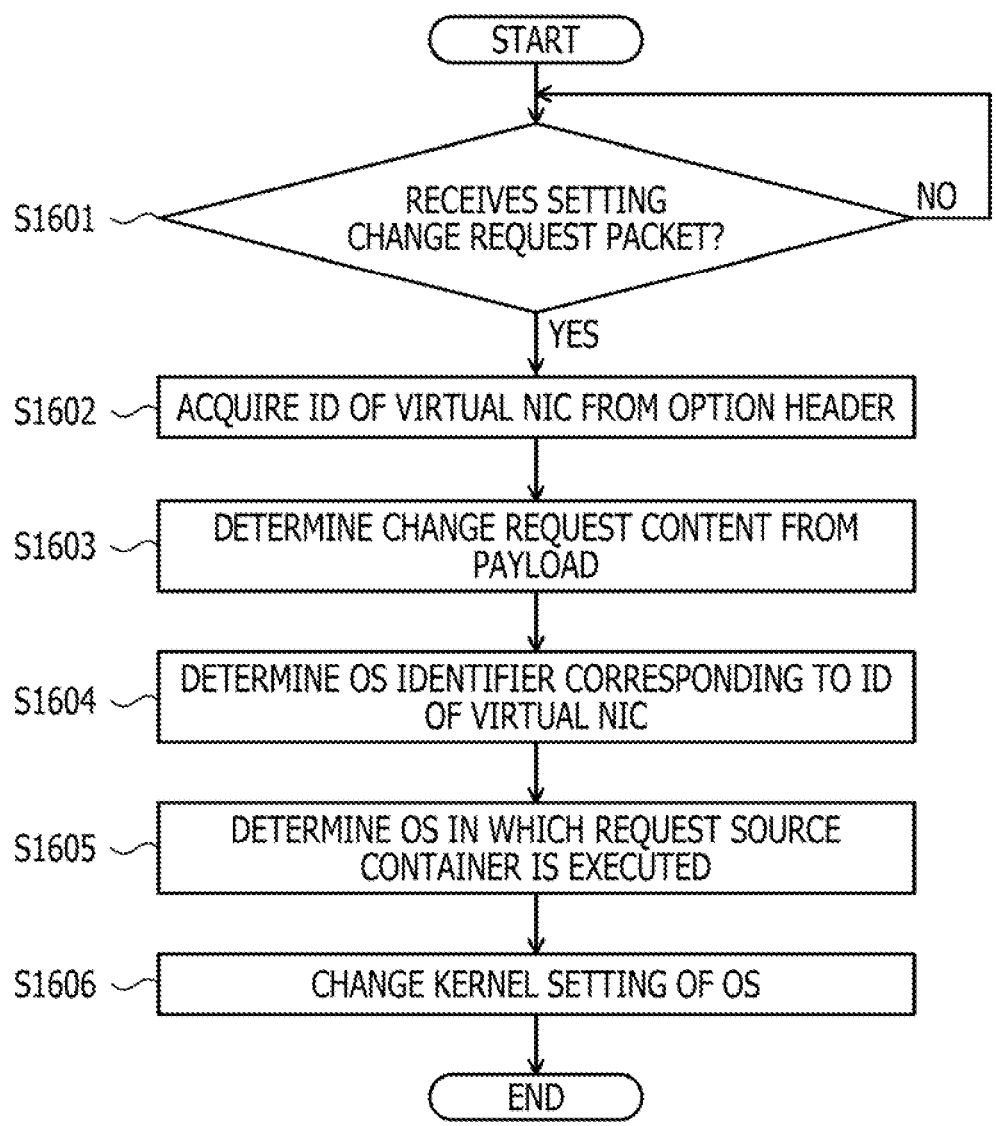
FIG. 16 is a flowchart illustrating an example of a setting change processing procedure of a kernel control unit kc according to Embodiment 1.

FIG. 16 is a flowchart illustrating an example of a setting change processing procedure of the kernel control unit kc according to Embodiment 1. In the flowchart of FIG. 16, first, the kernel control unit kc determines whether it receives a setting change request packet (step S1601). The kernel control unit kc waits for reception of a setting change request packet (step S1601: No).

When the kernel control unit kc receives a setting change request packet (step S1601: Yes), the kernel control unit kc acquires the ID of the virtual NIC, from the option header of the received setting change request packet (step S1602). The ID of the virtual NIC is the ID (virtual NIC identifier) of the virtual NIC that is coupled to the virtual NIC for the container cr and that has received the setting change request packet.

Next, the kernel control unit kc determines the kernel setting change request content, from the payload of the received setting change request packet (step S1603). The kernel control unit kc then refers to the virtual NIC OS correspondence table 200 and determines the OS identifier corresponding to the acquired ID (virtual NIC identifier) of the virtual NIC (step S1604).

Next, the kernel control unit kc determines the OS identified by the determined OS identifier, as the OS # in which the request source container cr is executed (step S1605). The kernel control unit kc then changes the kernel setting of the determined OS # based on the determined kernel setting change request content (step S1606), and terminates the series of processes according to the flowchart.

The kernel control unit kc may thus identify the OS # to be controlled based on the ID of the virtual NIC and change the kernel setting of the OS # when the kernel control unit kc receives the kernel setting change request.

As described above, according to the information processing system 100 of Embodiment 1, the kernel control unit kc receives the setting change request packet for the kernel from the change request module rm operating over the container cr executed on one OS #. The kernel control unit kc also acquires the ID (virtual NIC identifier) of the virtual NIC that has received the setting change request packet, from the received setting change request packet. The virtual NIC that has received the setting change request packet is the virtual NIC for coupling between the container cr and the OS # that is coupled to the virtual NIC for the container cr in a facing manner. The kernel control unit kc may then refer to the storage unit 910 and determine the OS # in which the container cr is operating, based on the acquired ID (virtual NIC identifier) of the virtual NIC. For example, the kernel control unit kc refers to the virtual NIC/OS correspondence table 200 to determine the OS identifier corresponding to the acquired ID (virtual NIC identifier), and determines the OS identified by the determined OS identifier, as the OS # in which the container cr is operating.

The kernel control unit kc may thus determine the OS # in which the target container Cr is operating, according to the setting change request from the user who has no authority to manage the kernel. For example, the kernel control unit kc may easily determine which one of the OSs operating in different hosts and virtual environments is the OS # over which the container cr being the target in the setting change is operating, and the work load and the work time taken to determine the OS # in the setting change may be reduced.

According to the information processing system 100, the kernel control unit kc may change the kernel setting of the determined OS # based on the change request content determined from the setting change request packet.

The kernel setting of the OS # in which the target container cr is operating may be thus automatically changed according to the setting change request from the user who has no authority to manage the kernel, and the work load and the work time taken to change the setting of the OS may be reduced.

According to the information processing system 100, the processing module pm may write the ID (virtual NIC identifier) of the virtual NIC that has received the setting change request packet, to the option header of the setting change request packet. The processing module pm is a module arranged between the protocol stack of the OS # and the virtual NIC for coupling between the container cr and the OS # that is coupled to the virtual NIC for the container cr.

The program (so-called small VM) arranged between the protocol stack and the container-OS coupling virtual NIC may thereby add a sign (virtual NIC identifier) for determining the OS # to the packet by utilizing the fact that the virtual NIC for container and the container-OS coupling virtual NIC are coupled to face each other in a one-to-one manner.

According to the information processing system 100, the change request module rm may set the multicast address for the setting change request as the destination address of the setting change request packet.

The change request module rm (container cr) thus does not have to change the setting of the destination address of the setting change request packet even when the execution location of the container cr is changed.

According to the information processing system 100, the kernel control unit kc may acquire the ID (virtual NIC identifier) of the virtual NIC that has received the setting change request packet, from the option header of the received setting change request packet. The option header is, for example, a record route option header or a time stamp option header.

The ID (virtual NIC identifier) of the virtual NIC that has received the setting change request packet may be thus recorded by using the available option header in the IP packet.

According to the information processing system 100, the processing module pm may add an option header to the setting change request packet.

The processing module pm may thereby change the packet format of the setting change request packet and record the ID (virtual NIC identifier) of the virtual NIC without using an option header such as a record route option header or a time stamp option header.

According to the information processing system 100, when the representative address for kernel control is set as the destination address of the setting change request packet, the processing module pm may rewrite the destination address to the specific address for kernel control corresponding to the processing module pm.

The change request module rm (container cr) thus does not have to change the setting of the destination address of the setting change request packet even when the execution location of the container cr is changed. Communication traffic in the setting change request may also be reduced from that in the case of using the multicast address.

Embodiment 2

Next, a setting change method according to Embodiment 2 will be described. In Embodiment 2, description is given of the case where the kernel control units kc are arranged in the respective OSs (host OS and guest OS) in a distributed manner and the IDs of the virtual NICs are managed on an OS-by-OS basis. The same parts as those described in Embodiment 1 are denoted by the same reference numerals, and illustration and description thereof are omitted.

Figure 17:
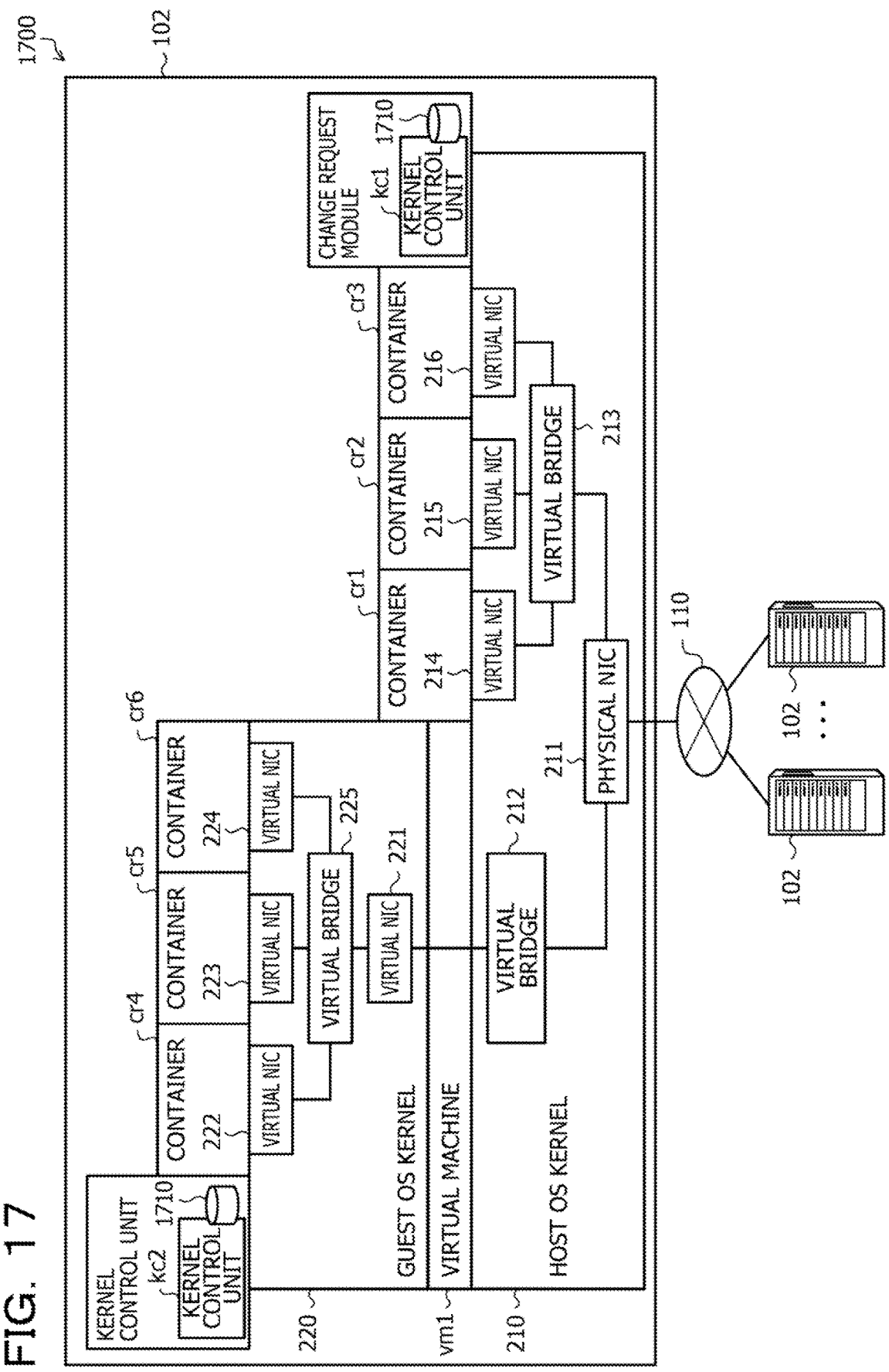
FIG. 17 is an explanatory diagram illustrating a system configuration example of an information processing system 1700 according to Embodiment 2.

FIG. 17 is an explanatory diagram illustrating a system configuration example of an information processing system 1700 according to Embodiment 2. In FIG. 17, the information processing system 1700 includes multiple operation servers 102 coupled via a network 110. Containers cr and virtual machines vm are activated over the operation servers 102.

In the example of FIG. 17, a virtual machine vm1 and containers cr1 to cr3 are operating over a host OS 210 of one operation server 102. A kernel control unit kc1 is executed in a user space of the host OS 210. The host OS 210 includes a physical NIC 211, virtual bridges 212, 213, and virtual NICs 214 to 216.

Containers cr4 to cr6 are also operating over a guest OS 220 of the virtual machine vm1. A kernel control unit kc2 is executed in a user space of the guest OS 220 of the virtual machine vm1. The guest OS 220 includes virtual NICs 221 to 224 and a virtual bridge 225.

Each of the kernel control units kc1, kc2 creates a virtual NIC/OS correspondence table 1710. The virtual NIC/OS correspondence table 1710 stores information indicating correspondence relationships between identification information of the OS of the corresponding kernel control unit and identification information of the virtual NICs in this OS. The virtual NIC/OS correspondence table 1710 may be created in advance and stored in each of the kernel control units kc1, kc2.

For example, the identification information of the OS of the kernel control unit kc1 is assumed to be an OS identifier "a". In this case, the virtual NIC/OS correspondence table 1710 of the kernel control unit kc1 stores only virtual NIC information (for example, the virtual NIC information 600-1 to 600-3 illustrated in FIG. 6) in which the OS identifier "a" of the OS of the kernel control unit kc1 is associated with the virtual NIC identifiers of the virtual NICs in this OS. The virtual NIC/OS correspondence table 1710 includes, for example, information for determining a control target module in the kernel corresponding to each virtual NIC. In further detail, for example, the OS identifier may be information specifying a control target module in the kernel of the OS of the corresponding kernel control unit.

As described above, in the information processing system 1700, the kernel control units kc (for example, the kernel control units kc1, kc2) are arranged in the respective OSs (for example, the host OS 210 and the guest OS 220) in a distributed manner. Each kernel control unit kc thus only has to manage the IDs of the virtual NICs in its OS (OS executing the kernel control unit kc). It is also possible to omit labor for making the IDs of the virtual NICs in each OS consistent between the OSs.

(Discarding of Setting Change Request Packet)

Next, the case where the setting change request packet is discarded in an external coupling NIC in each OS (host OS and guest OS) is described with reference to FIG. 18.

Figure 18:
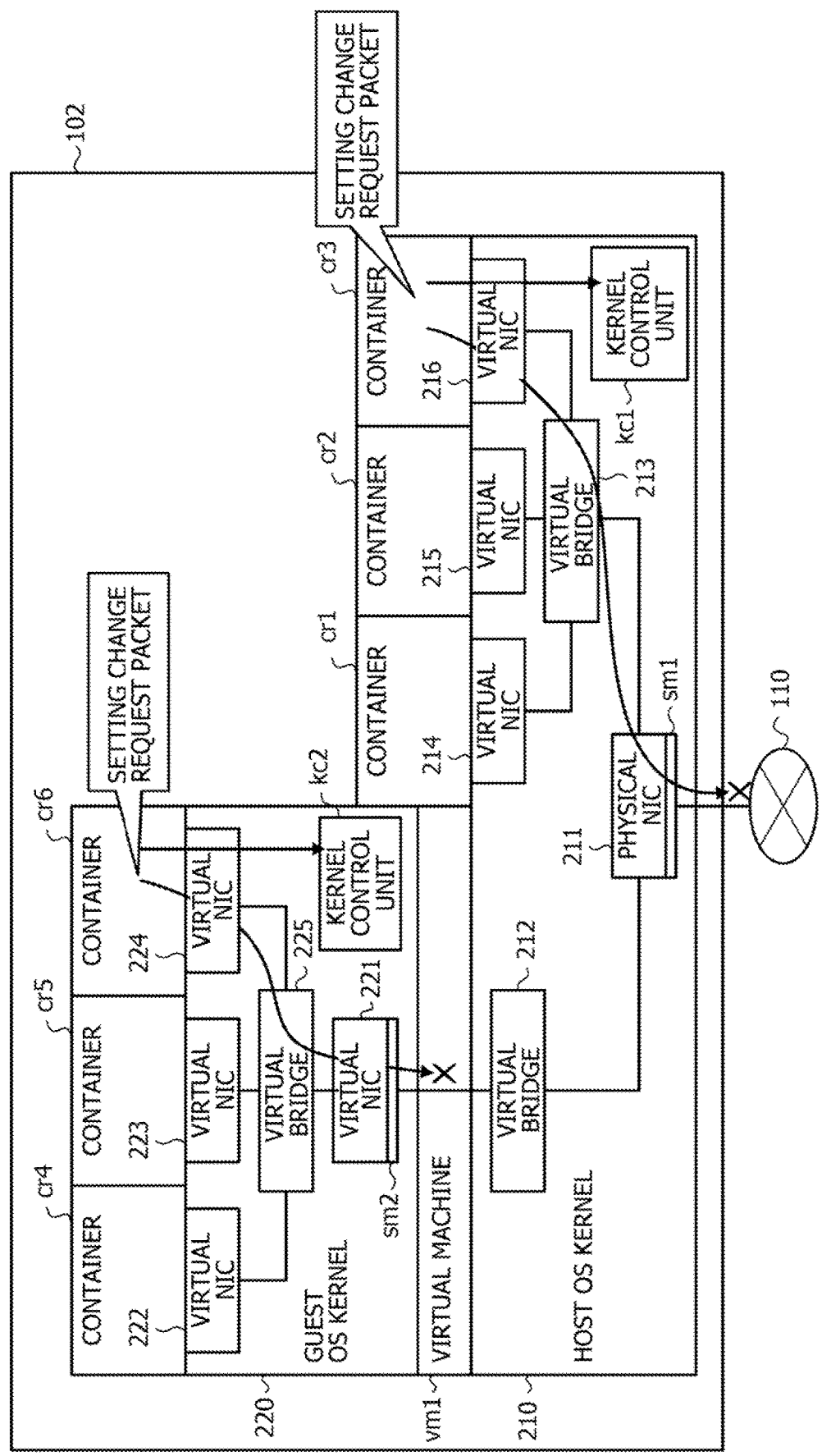
FIG. 18 is an explanatory diagram illustrating an example of discarding the setting change request packet.

FIG. 18 is an explanatory diagram illustrating an example of discarding the setting change request packet. In FIG. 18, a check module sm1 is a module provided corresponding to the physical NIC 211. A check module sm2 is a module provided corresponding to the virtual NIC 221. The check modules sm1, sm2 are achieved by, for example, programs (so-called small VMs).

The check module sm1 checks packets entering and leaving the physical NIC 211. For example, when the destination address of a packet received by the physical NIC 211 from the outside (network 110 side) is the address of the kernel control unit kc1, the check module sm1 discards the packet. An unauthorized packet from the outside disguised as a control request may be thereby discarded in the external coupling NIC.

When a sign (ID of the virtual NIC) is recorded in an option header of a packet received by the physical NIC 211 from the inside (virtual machine vm or container cr side), the check module sm1 discards the packet. An unauthorized packet to the outside disguised as a control request may be thereby discarded in the external coupling NIC.

The check module sm2 checks packets entering and leaving the virtual NIC 221. For example, when the destination address of a packet received by the virtual NIC 221 from the outside (the host OS 210 side) is the address of the kernel control unit kc2, the check module sm2 discards the packet. An unauthorized packet from the outside disguised as a control request may be thereby discarded in the external coupling NIC.

When a sign (ID of the virtual NIC) is recorded in an option header of a packet received by the virtual NIC 221 from the inside (container cr side), the check module sm2 discards the packet. An unauthorized packet to the outside disguised as a control request may be thereby discarded in the external coupling NIC.

As described above, providing the function (check modules sm1, sm2) of discarding an unauthorized packet in the external coupling NIC of each OS (host OS and guest OS) may improve security without causing the hosts and the virtual machines to cooperate with one another.

(Example of Rearranging Container cr)

Description is given of an example of rearranging the container cr from one operation server 102 to another.

Figure 19:
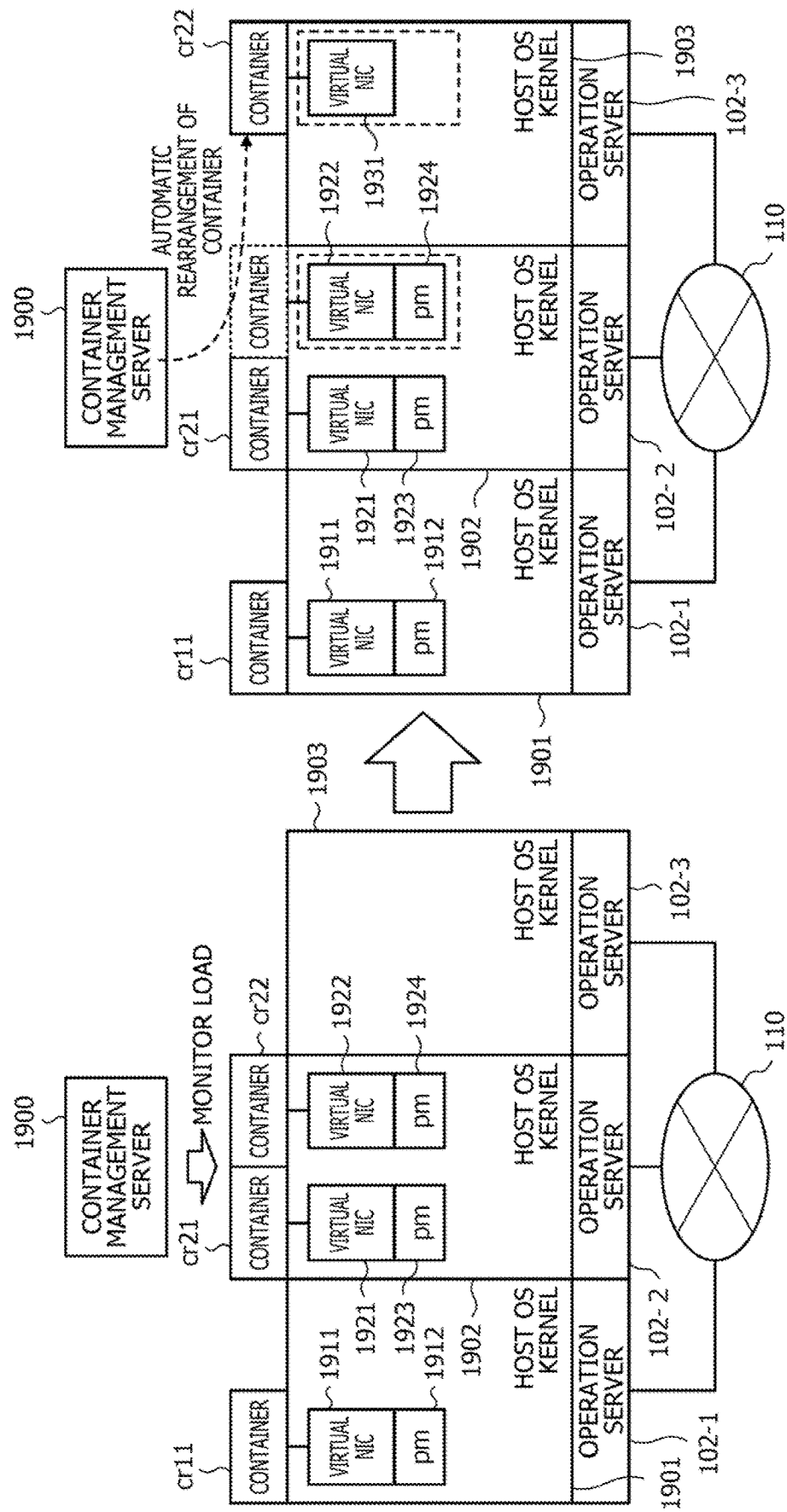
FIG. 19 is an explanatory diagram illustrating an example of rearranging the container.

FIG. 19 is an explanatory diagram illustrating an example of rearranging the container. In FIG. 19, 102, operation servers 102-1, 102-2, 102-3 are illustrated as three operation servers 102. A container management server 1900 is a computer that monitors load of each of the operation servers 102-1, 102-2, 102-3 and rearranges the containers cr depending on the load.

In the state before the rearrangement, a container cr11 is operating over a host OS 1901 of the operation server 102-1. A virtual NIC 1911 is the virtual NIC for coupling to the container cr11. A processing module 1912 is the processing module pm corresponding to the virtual NIC 1911.

Containers cr21, cr22 are operating over a host OS 1902 of the operation server 102-2. A virtual NIC 1921 is the virtual NIC for coupling to the container cr21. A virtual NIC 1922 is the virtual NIC for coupling to the container cr22. A processing module 1923 is the processing module pm corresponding to the virtual NIC 1921. A processing module 1924 is the processing module pm corresponding to the virtual NIC 1922.

In the state before the rearrangement, no container cr is executed over a host OS 1903 of the operation server 102-3. Accordingly, it is assumed that the operation server 102-2 is in a high load state and the operation server 102-3 is in a low load state among the operation servers 102-1 to 102-3.

Assume that the container management server 1900 thus moves the container cr22 executed over the operation server 102-2 to the host OS 1903 of the operation server 102-3. A virtual NIC 1931 of the host OS 1903 is the virtual NIC for coupling to the container cr22.

In this case, the processing module 1924 remains over the host OS 1902 of the operation server 102-2. Meanwhile, a processing module pm corresponding to the virtual NIC 1931 is absent over the host OS 1903 of the operation server 102-3.

A function of automatically performing maintenance of the processing module pm depending on operations such as the rearrangement of the container cr from one operation server 102 to another is described below with reference to FIGS. 20 to 23.

Figure 20:
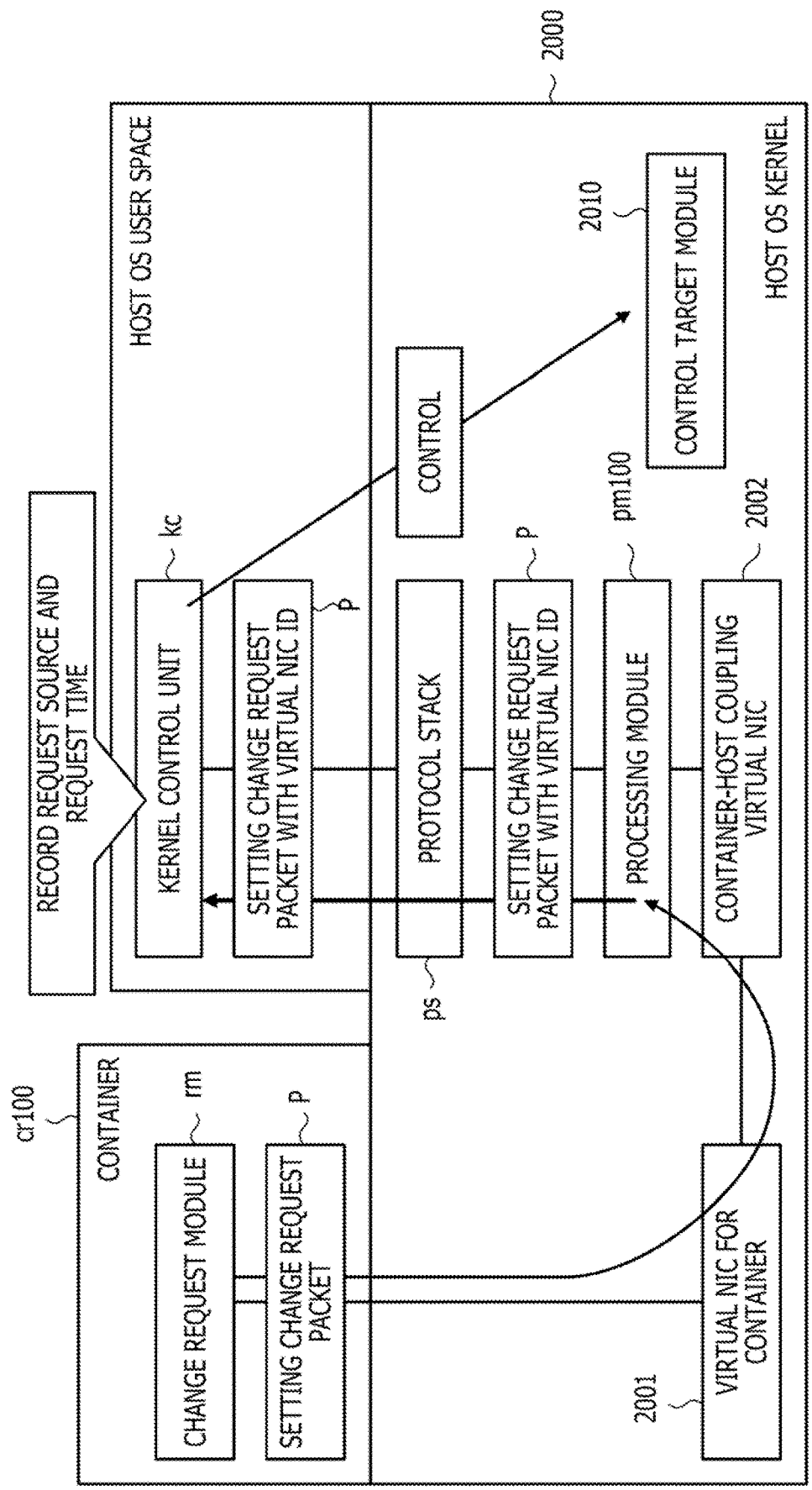
FIG. 20 is an explanatory diagram (part 1) illustrating an operation example of the kernel control unit kc according to Embodiment 2.

FIGS. 20 to 23 are explanatory diagrams illustrating an operation example of the kernel control unit kc according to Embodiment 2. In FIG. 20, the change request module rm of a container cr100 over a host OS 2000 transmits a setting change request packet P to the kernel control unit kc. For example, the change request module rm periodically transmits the setting change request packet P to the kernel control unit kc at predetermined time period.

The above-described predetermined time period may be set to any time period and is set to a time period of, for example, about 30 seconds. For example, even when the kernel setting is not changed, the change request module rm periodically transmits the setting change request packet P to the kernel control unit kc. When the kernel setting is not changed, the current kernel setting is recorded as the request content in a payload of the setting change request packet P.

A processing module pm 100 receives the setting change request packet P transmitted from the change request module rm, via a virtual NIC for container 2001 and a container-host coupling virtual NIC 2002. When the processing module pm100 receives the setting change request packet P, the processing module pm100 writes an ID of the container-host coupling virtual NIC 2002, to a header of the setting change request packet P and transfers the packet P.

Figure 24:
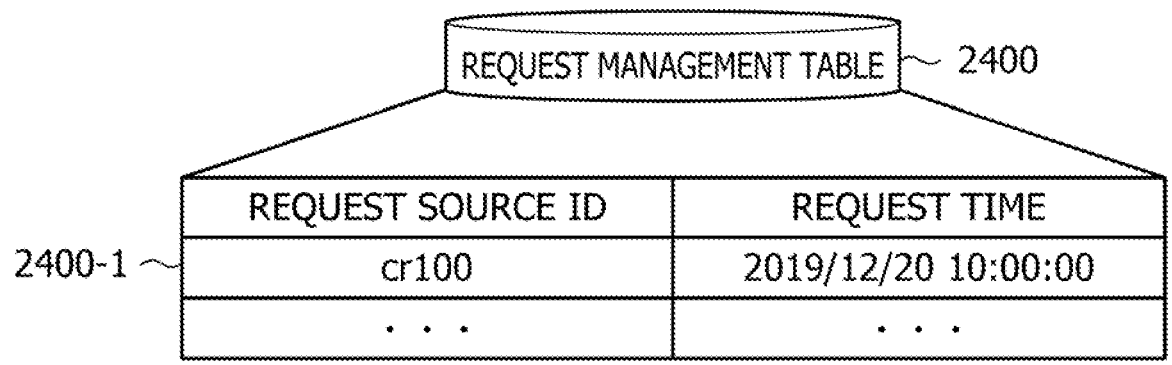
FIG. 24 is an explanatory diagram illustrating an example of storage contents of a request management table 2400.

When the kernel control unit kc receives the setting change request packet P, the kernel control unit kc records a request source ID and request time in a request management table 2400 as illustrated in FIG. 24. Storage contents of the request management table 2400 are described below.

FIG. 24 is an explanatory diagram illustrating an example of the storage contents of the request management table 2400. In FIG. 24, the request management table 2400 has fields for the request source ID and the request time and stores request management information (for example, request management information 2400-1) as records by setting information in each field.

The request source ID is an identifier for uniquely identifying a request source of the kernel setting change (source of the setting change request packet). For example, an identifier for identifying the request source container cr such as a source address of the setting change request packet may be used as the request source ID. The request time indicates the date and time when the kernel setting change is requested.

For example, the request management information 2400-1 indicates the request time "2019 Dec. 20 10:00:00" for the request source ID "cr100". In this case, assume that the request source ID "cr100" is information for identifying the container cr100.

Returning to the description of FIG. 20, when the kernel control unit kc receives the setting change request packet P, the kernel control unit kc acquires the ID of the container-host coupling virtual NIC 2002, from the header of the setting change request packet P. For example, the kernel control unit kc refers to the virtual NIC/OS correspondence table 1710 and confirms that the virtual NIC 2002 is the virtual NIC of its OS based on the acquired ID (virtual NIC identifier).

For example, the kernel control unit kc refers to the virtual NIC/OS correspondence table 1710 and determines a control target module 2010 in the kernel, from the acquired ID (virtual NIC identifier). The kernel control unit kc acquires the kernel setting change request content from the payload of the setting change request packet P. The kernel control unit kc then changes the setting of the control target module 2010 based on the determined change request content.

Figure 21:
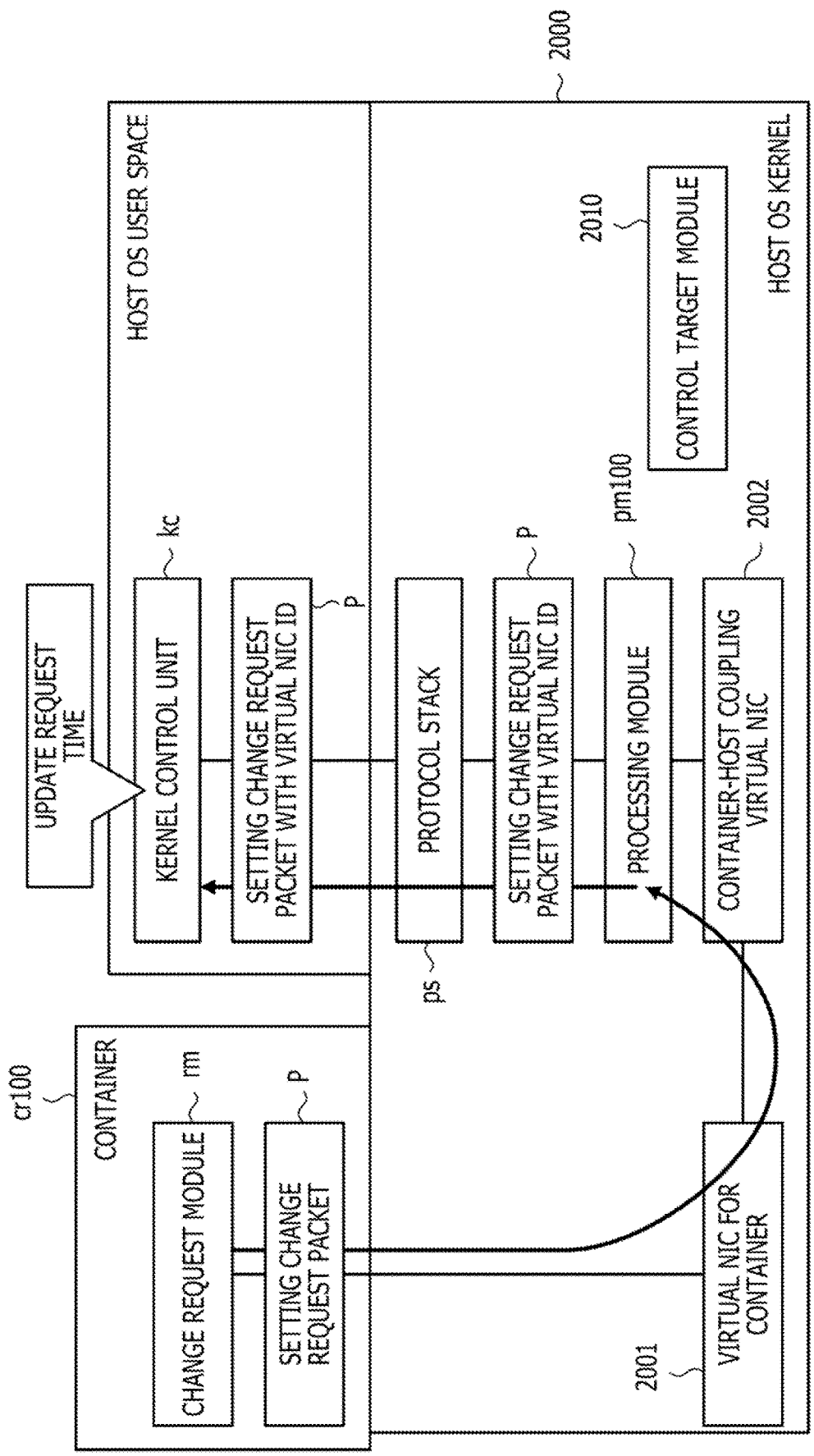
FIG. 21 is an explanatory diagram (part 2) illustrating the operation example of the kernel control unit kc according to Embodiment 2.

In FIG. 21, when the kernel control unit kc receives a new setting change request packet P, the kernel control unit kc refers to the request management table 2400 and updates the request time corresponding to the request source ID "cr100" that is the same as the request source ID of the new setting change request packet P, to the current time.

Figure 22:
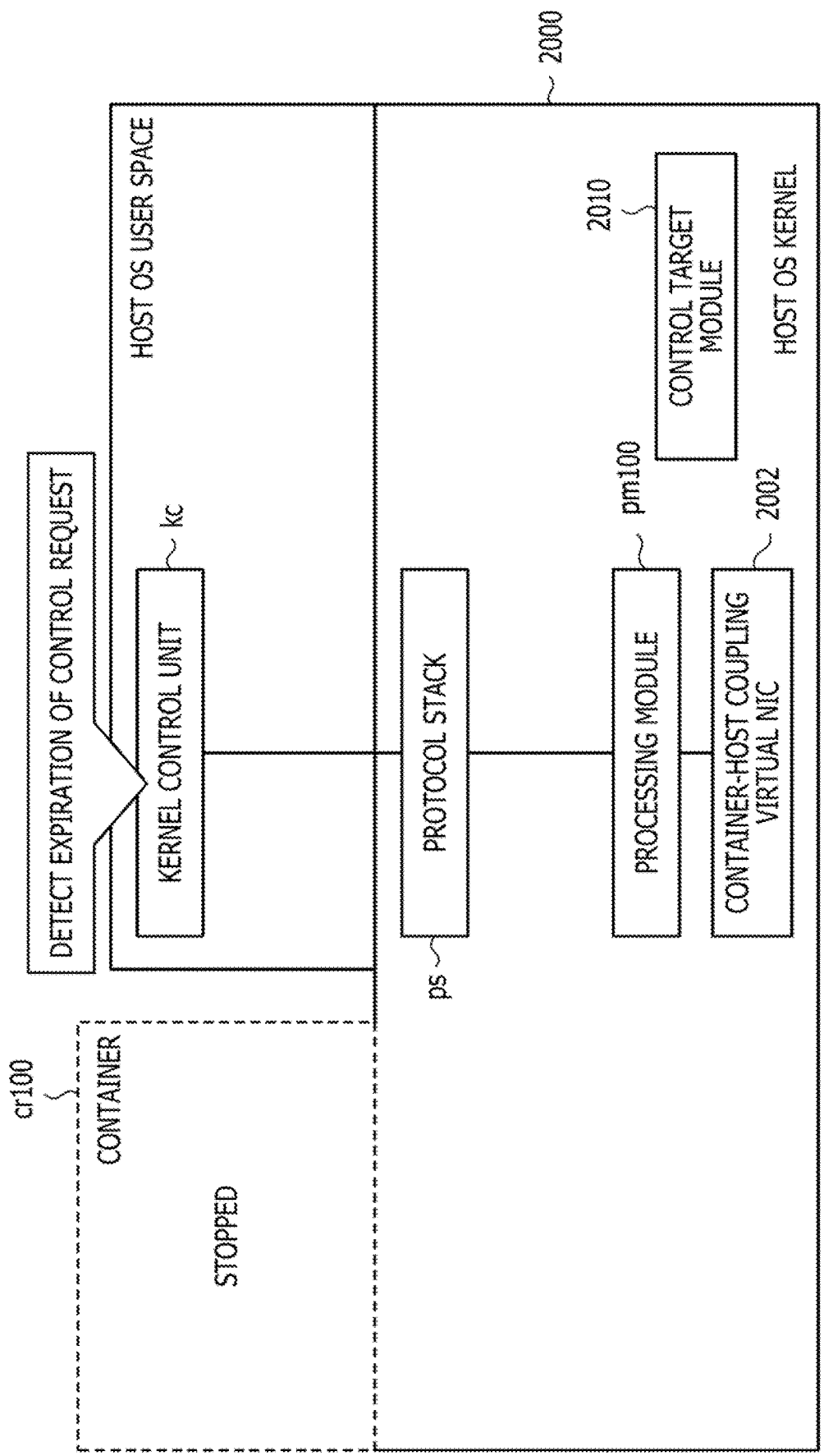
FIG. 22 is an explanatory diagram (part 3) illustrating the operation example of the kernel control unit kc according to Embodiment 2.

In FIG. 22, the container cr100 over the host OS 2000 is stopped due to moving or the like. The kernel control unit kc refers to the request management table 2400 and determines whether a predetermined time period T has elapsed from the request time corresponding to the request source ID "cr100". The predetermined time period T may be set to any time period and is set to, for example, a time period of about 3 to 5 minutes. When the predetermined time period T has elapsed from the request time corresponding to the request source ID "cr100", the kernel control unit kc detects expiration of the control request corresponding to the request source ID "cr100".

Figure 23:
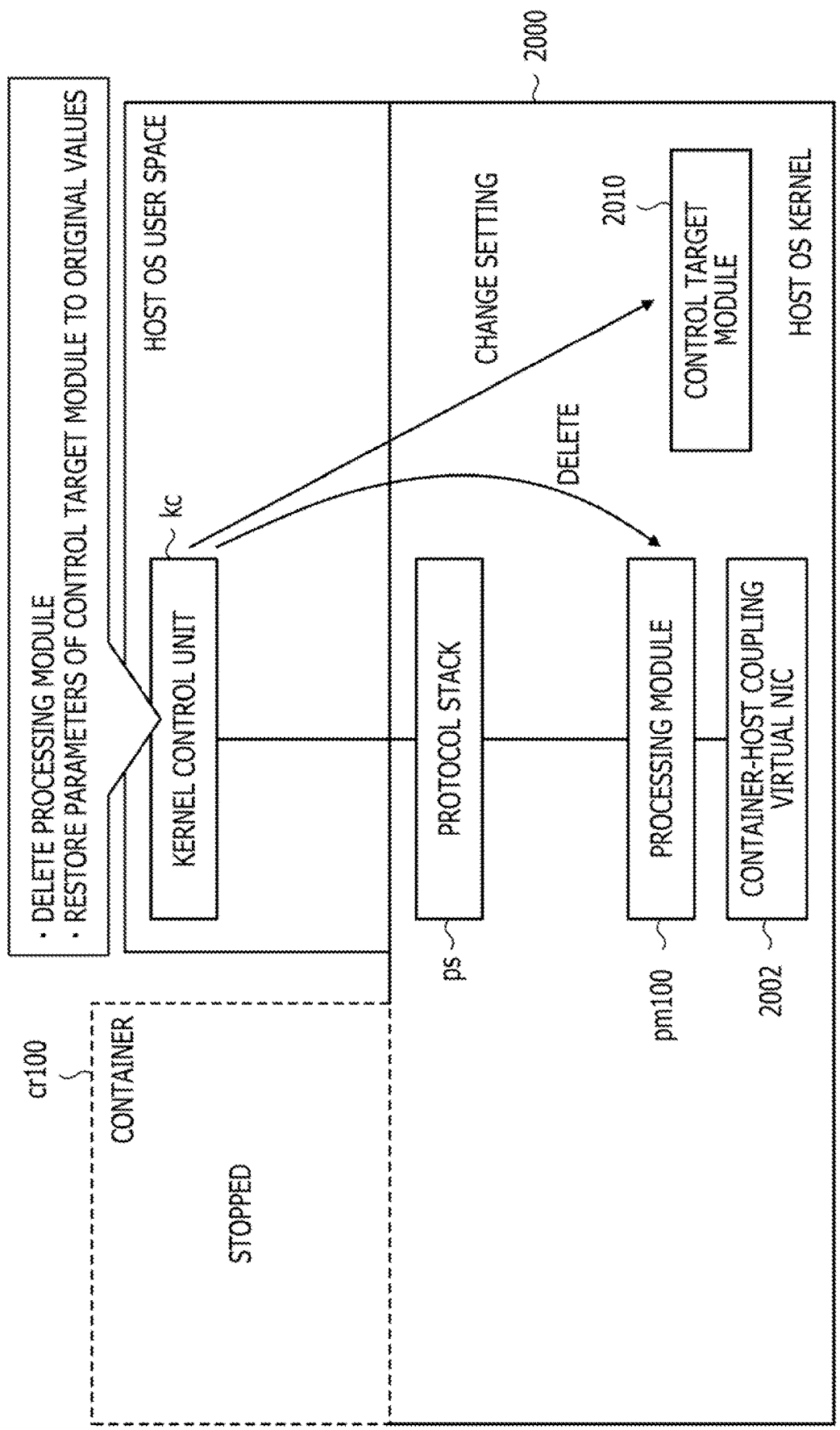
FIG. 23 is an explanatory diagram (part 4) illustrating the operation example of the kernel control unit kc according to Embodiment 2.

In FIG. 23, when the kernel control unit kc detects expiration of the control request corresponding to the request source ID "cr100", the kernel control unit kc deletes the processing module pm100 for the container cr100 identified by the request source ID "cr100". The kernel control unit kc also changes the setting of the control target module 2010 to an initial setting.

Maintenance of the processing module pm may be thus automatically performed depending on operations such as the rearrangement of the container cr from one operation server 102 to another.

(Various Processing Procedures of information Processing System 1700)

Next, various processing procedures of the information processing system 1700 according to Embodiment 2 are described. First, a check processing procedure of the check modules sm (for example, the check modules sm1, sm2 illustrated in FIG. 18) is described with reference to FIG. 25. Check processing for discarding an unauthorized packet from the outside disguised as a control request is described herein as an example.

Figure 25:
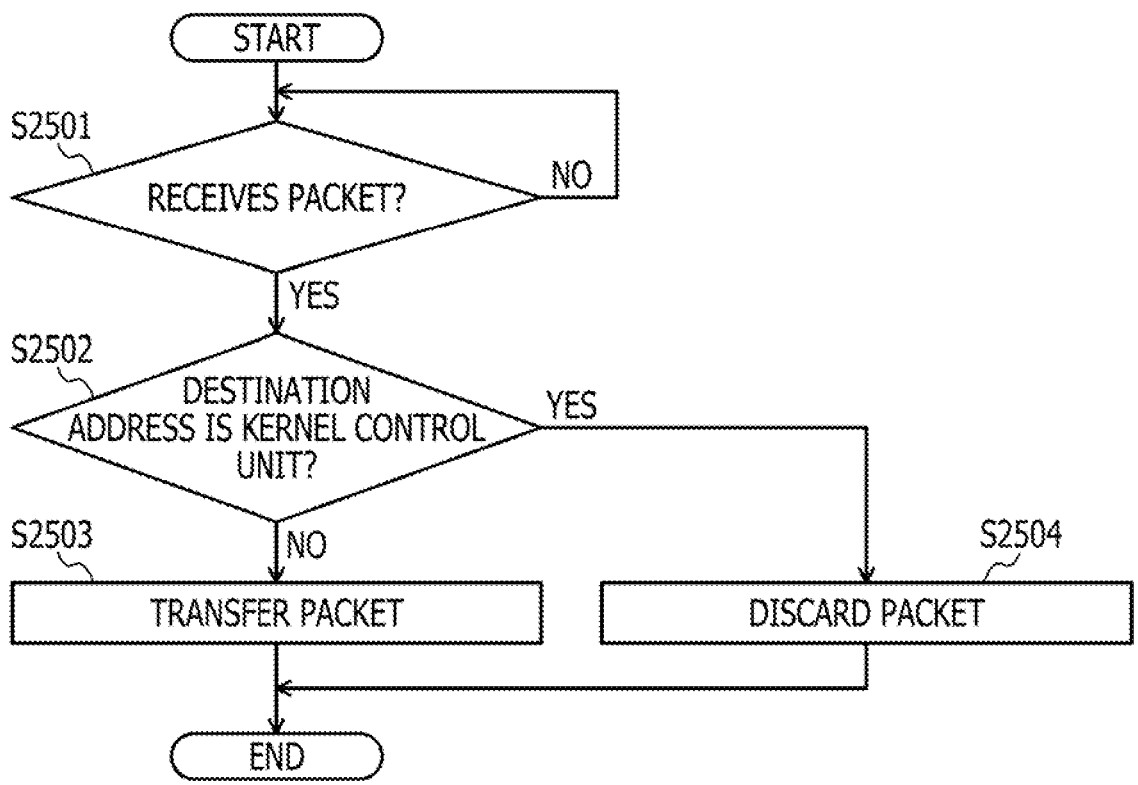
FIG. 25 is a flowchart illustrating an example of a check processing procedure of a check module sm according to Embodiment 2.

FIG. 25 is a flowchart illustrating an example of the check processing procedure of each check module sm according to Embodiment 2. In the flowchart of FIG. 25, first, the check module sm determines whether it receives a packet from the outside (step S2501). The check module sm waits for reception of a packet (step S2501: No).

When the check module sm receives a packet (step S2501: Yes), the check module sm determines whether the destination address of the packet is the address of the kernel control unit kc (step S2502). When the destination address is not the address of the kernel control unit kc (step S2502: No), the check module sm transfers the packet (step S2503) and terminates the series of processes according to the flowchart.

Meanwhile, when the destination address is the address of the kernel control unit kc (step S2502: Yes), the check module sm discards the packet (step S2504) and terminates the series of processes according to the flowchart. An unauthorized packet from the outside disguised as a control request may be thereby discarded in the external coupling NIC.

Next, a change request processing procedure of the change request module rm according to Embodiment 2 is described with reference to FIG. 26.

Figure 26:
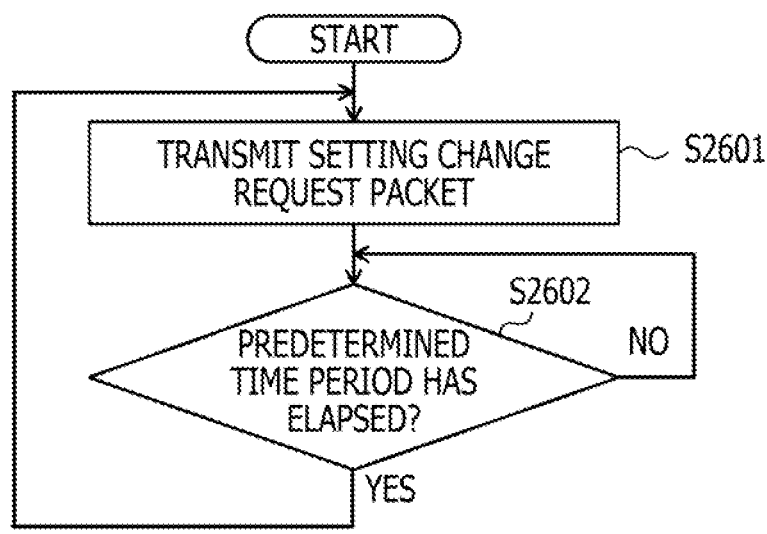
FIG. 26 is a flowchart illustrating an example of a change request processing procedure of a change request module rm according to Embodiment 2.

FIG. 26 is a flowchart illustrating an example of a change request processing procedure of the change request module rm according to Embodiment 2. In the flowchart of FIG. 26, first, the change request module rm transmits a setting change request packet to the kernel control unit kc (step S2601).

Next, the change request module rm determines whether a predetermined time period elapses from the transmission of the setting change request packet (step S2602). The change request module rm waits for the predetermined time period to elapse (step S2602: No). When the predetermined time period elapses (step S2602: Yes), the change request module rm returns to step S2601.

The setting change request packet P may be thereby periodically transmitted from the change request module rm of the container cr to the kernel control unit kc.

Next, a setting change processing procedure of the kernel control unit kc according to Embodiment 2 is described with reference to FIGS. 27 and 28. First, a first setting change processing procedure of the kernel control unit kc is described with reference to FIG. 27.

Figure 27:
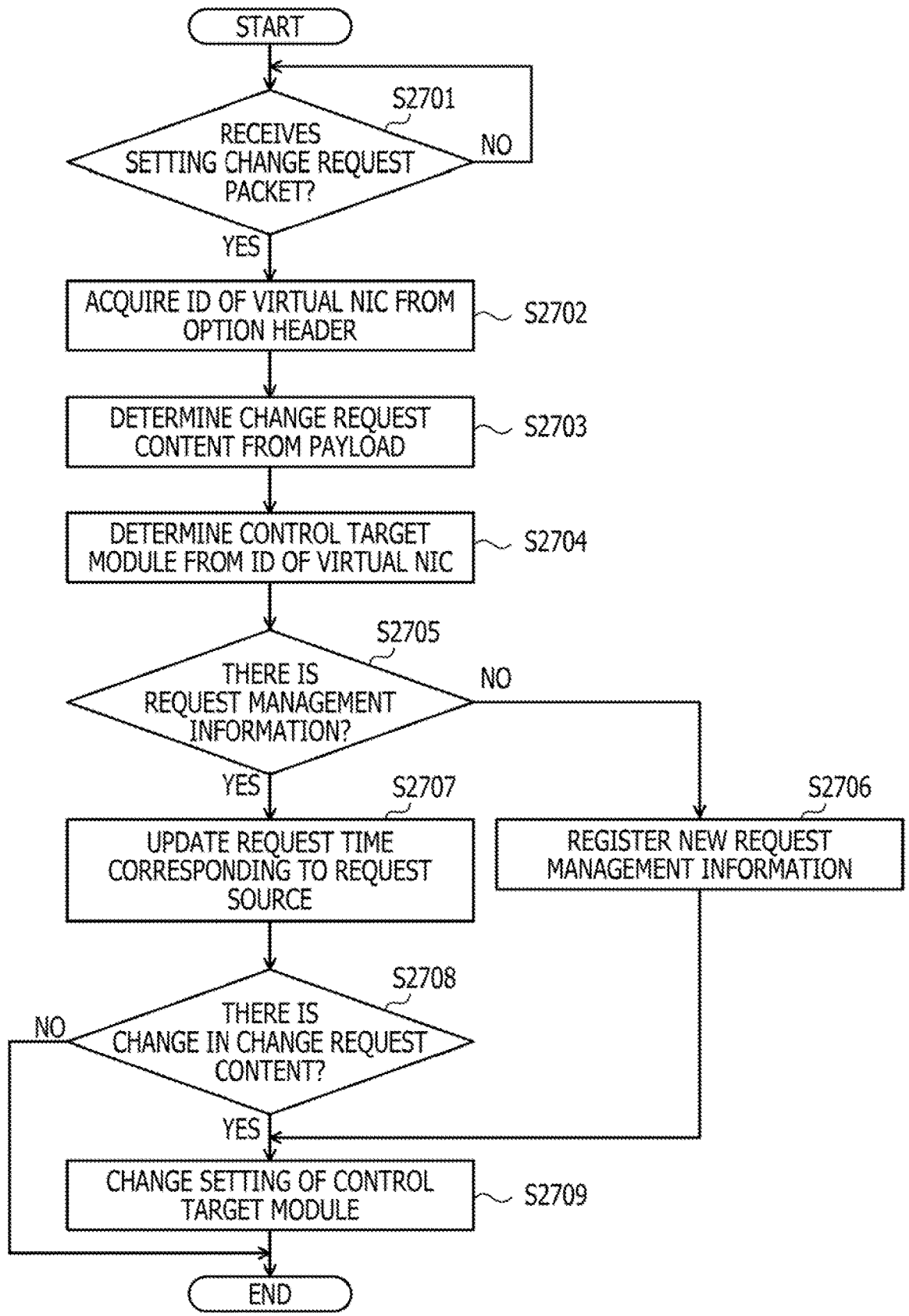
FIG. 27 is a flowchart illustrating an example of a first setting change processing procedure of the kernel control unit kc according to Embodiment 2.

FIG. 27 is a flowchart illustrating an example of the first setting change processing procedure of the kernel control unit kc according to Embodiment 2. In the flowchart of FIG. 27, first, the kernel control unit kc determines whether it receives a setting change request packet (step S2701). The kernel control unit kc waits for reception of a setting change request packet (step S2701: No).

When the kernel control unit kc receives a setting change request packet (step S2701: Yes), the kernel control unit kc acquires the ID of the virtual NIC from the option header of the received setting change request packet (step S2702). Next, the kernel control unit kc determines the kernel setting change request content from the payload of the received setting change request packet (step S2703).

The kernel control unit kc then refers to the virtual NIC/OS correspondence table 1710 and the like and determines the control target module in the kernel, from the acquired ID of the virtual NIC (step S2704). Next, the kernel control unit kc refers to the request management table 2400 and determines whether there is request management information corresponding to the request source (step S2705). The request source is the source of the setting change request packet.

When there is no request management information corresponding to the request source (step S2705: No), the kernel control unit kc registers new request management information corresponding to the request source (step S2706) and proceeds to step S2709. The request management information includes a request source ID of the request source and a request time (current time).

Meanwhile, when there is request management information corresponding to the request source (step S2705: Yes), the kernel control unit kc updates the request time of the request management information corresponding to the request source in the request management table 2400 to the current time (step S2707). The kernel control unit kc then determines whether there is a change in the change request content (step S2708).

The kernel control unit kc may determine whether a change is present or absent by, for example, comparing the change request content in this operation with the current kernel setting content. When the previous change request content is recorded, the kernel control unit kc may determine whether a change is present or absent by comparing the change request content in this operation with the previous change request content.

When there is no change in the change request content (step S2708: No), the kernel control unit kc terminates the series of processes according to the flowchart. Meanwhile, when there is a change in the change request content (step S2708: Yes), the kernel control unit kc changes the setting of the determined control target module based on the determined kernel setting change request content (step S2709) and terminates the series of processes according to the flowchart.

The kernel control unit kc may thereby identify the control target module based on the ID of the virtual NIC and change the kernel setting when the kernel control unit kc receives the kernel setting change request.

Next, a second setting change processing procedure of the kernel control unit kc is described with reference to FIG. 28. The second setting change processing procedure is executed at predetermined time period of, for example, about 30 seconds.

Figure 28:
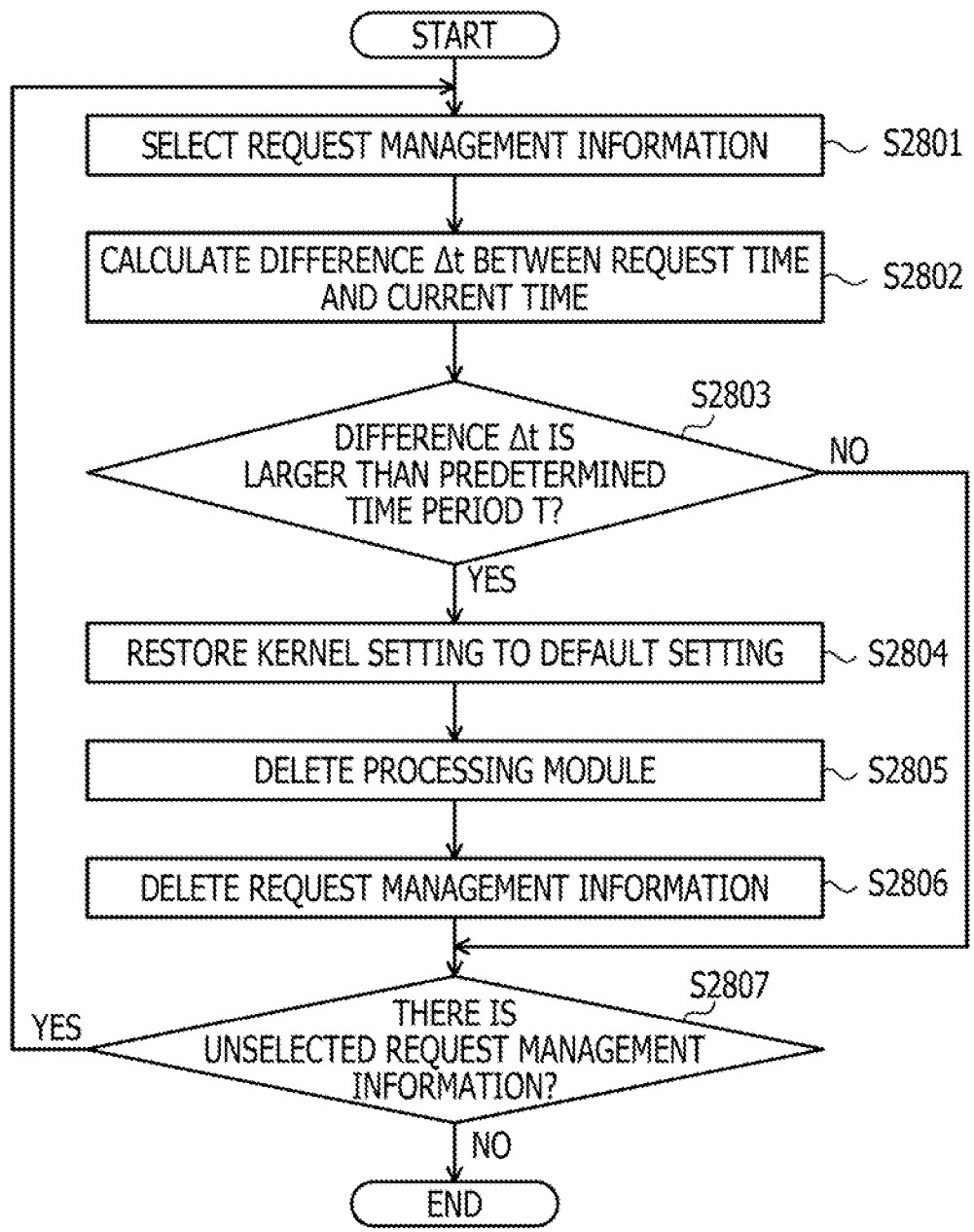
FIG. 28 is a flowchart illustrating an example of a second setting change processing procedure of the kernel control unit kc according to Embodiment 2.

FIG. 28 is a flowchart illustrating an example of the second setting change processing procedure of the kernel control unit kc according to Embodiment 2. In the flowchart of FIG. 28, first, the kernel control unit kc selects unselected request management information that is not selected yet from the request management table 2400 (step S2801).

Next, the kernel control unit kc calculates a difference $\Delta t$ between the request time of the selected request management information and the current time (step S2802). The kernel control unit kc then determines whether the calculated difference $\Delta t$ is larger than a predetermined time period T (step S2803). When the difference $\Delta t$ is equal to or less than the predetermined time period T (step S2803: No), the kernel control unit kc proceeds to step S2807.

Meanwhile, when the difference $\Delta t$ is larger than the predetermined time period T (step S2803: Yes), the kernel control unit kc restores the kernel setting of the control target module determined from the request source ID of the selected request management information, to a default setting (step S2804). The control target module is a module assigned to the request source container cr.

Next, the kernel control unit kc deletes the processing module pm corresponding to the container cr determined from the request source ID of the selected request management information (step S2805). The kernel control unit kc then deletes the selected request management information from the request management table 2400 (step S2806).

Next, the kernel control unit kc determines whether there is unselected request management information that is not selected yet from the request management table 2400 (step S2807). When there is unselected request management information (step S2807: Yes), the kernel control unit kc returns to step S2801.

Meanwhile, when there is no unselected request management information (step S2807: No), the kernel control unit kc terminates the series of processes according to the flowchart. The maintenance of the processing module pm may be thus automatically performed depending on the moving of the container cr and the like.

As described above, according to the information processing system 1700 of Embodiment 2, each kernel control unit kc only has to manage the IDs of the virtual NICs in its OS and labor for making the IDs of the virtual NICs in each OS consistent between the OSs may be omitted.

According to the information processing system 1700, an unauthorized packet disguised as a control request may be discarded in the check module sm corresponding to the external coupling NIC of each OS (the host OS and the guest OS).

According to the information processing system 1700, the maintenance of the processing module pm may be automatically performed depending on operations such as the rearrangement of the container cr from one operation server 102 to another.

The setting change methods described in Embodiments 1 and 2 may be achieved by causing a computer such as a personal computer or a workstation to execute a program prepared in advance. The setting change program is recorded on a computer-readable recording medium such as a hard disk, a flexible disk, the CD-ROM, the DVD, or the USB memory and is executed by being read by the computer from the recording medium. The setting change program may also be distributed via a network such as the Internet.

The kernel control unit kc described in Embodiments 1 and 2 may also be achieved by an integrated circuit (IC) for a specific application such as a standard cell or a structured application-specific integrated circuit (ASIC), or by a programmable logic device (PLD) such as a field-programmable gate array (FPGA).

Regarding the above-described embodiments, the following supplementary notes are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A setting change method that causes a first computer and a second computer to execute processing-comprising:
   receiving, by the second computer, from one of containers of the second computer each provided for respective communication modules provided in the second computer, a setting change request packet for a kernel from software which operates over the one of the containers which is executed in one of operating systems (OSs);

writing, by the second computer, the identification information of the one of the communication module to the setting change request packet;

transferring, by the second computer, the setting change request packet to the first computer;

receiving, by the first computer, the setting change request packet;

acquiring, by the first computer, identification information of one of the communication modules from the setting change request packet;

referring, by the first computer, to a memory that stores information indicating correspondence relationships between identification information of the OSs and the identification information of the communication modules in which the OSs are executed; and determining, by the first computer, the OS in which the container operates based on the acquired identification information of the one of the communication module.

2. The setting change method according to claim 1, wherein the first computer is made to execute processing of changing a setting of the kernel of the determined OS based on change request content determined from the setting change request packet.

3. The setting change method according to claim 1, wherein the one of the communication module is a communication module which couples between one of the containers and the one of Oss and is coupled to the one of the containers in a facing manner.

4. The setting change method according to claim 3, wherein the processing module rewrites a destination address of the setting change request packet to a specific address for kernel control corresponding to the processing module when a representative address for kernel control is set as the destination address.

5. The setting change method according to claim 3, wherein
a control target module in the kernel of the OS is determined based on the acquired identification information of the one of the communication module.

6. The setting change method according to claim 5, wherein the first computer is made to execute processing of changing a setting of the determined control target module based on change request content determined from the setting change request packet.

7. The setting change method according to claim 6, wherein the setting change request packet is periodically transmitted from the software, and the first computer is made to execute processing of restoring the setting of the control target module changed based on the change request content to default setting when a time period elapsed from last reception of the setting change request packet exceeds a predetermined time period.

8. The setting change method according to claim 7, wherein the processing module is deleted when the time period elapsed from last reception of the setting change request packet exceeds the predetermined time period.

9. The setting change method according to claim 3, wherein the processing module adds the option header to the setting change request packet.

10. The setting change method according to claim 1, wherein the identification information of the communication module is written to an option header of the setting change request packet.

11. The setting change method according to claim 10, wherein the option header is a record route option header or a time stamp option header.

12. The setting change method according to claim 1, wherein a multicast address for a setting change request is set as a destination address of the setting change request packet.

13. The setting change method according to claim 1, wherein the communication modules are virtual NICs.

14. A non-transitory computer-readable recording medium recording a setting change program that causes a first computer and a second computer to execute processing comprising:

receiving, by the second computer, from one of containers of the second computer each provided for respective communication modules provided in the second computer, a setting change request packet for a kernel from software which operates over the one of the containers which is executed in one of operating systems (OSs);

writing, by the second computer, the identification information of the one of the communication module to the setting change request packet;

transferring, by the second computer, the setting change request packet to the first computer;

receiving, by the first computer, the setting change request packet;

acquiring, by the first computer, identification information of one of the communication modules from the received setting change request packet;

referring, by the first computer, to a memory that stores information indicating correspondence relationships between identification information of the OSs and the identification information of the communication modules in which the OSs are executed; and determining, by the first computer, the OS in which the container operates based on the acquired identification information of the one of the communication module.

* * * * *